United States Patent
Kim et al.

(10) Patent No.: US 12,420,760 B2
(45) Date of Patent: Sep. 23, 2025

(54) BRAKE APPARATUS

(71) Applicant: HL MANDO CORPORATION, Pyeongtaek-si (KR)

(72) Inventors: Jinseok Kim, Gyeonggi-do (KR); Joon-kyu Song, Gyeonggi-do (KR); Seungtae Baek, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 669 days.

(21) Appl. No.: 17/714,655

(22) Filed: Apr. 6, 2022

(65) Prior Publication Data

US 2022/0324425 A1   Oct. 13, 2022

(30) Foreign Application Priority Data

Apr. 7, 2021 (KR) .................. 10-2021-0045329
Apr. 7, 2021 (KR) .................. 10-2021-0045403
Feb. 11, 2022 (KR) .................. 10-2022-0018443

(51) Int. Cl.
*B60T 8/92* (2006.01)
*B60T 8/88* (2006.01)
*B60T 13/74* (2006.01)

(52) U.S. Cl.
CPC ............. *B60T 8/92* (2013.01); *B60T 8/885* (2013.01); *B60T 13/746* (2013.01);
(Continued)

(58) Field of Classification Search
CPC .......... B60T 8/92; B60T 13/746; B60T 8/885; B60T 2270/402; B60T 2270/404;
(Continued)

(56) References Cited

U.S. PATENT DOCUMENTS 6,345,225 B1    2/2002  Böhm et al.
2018/0056959 A1* 3/2018  Pennala .................. B60T 7/042
(Continued)

FOREIGN PATENT DOCUMENTS

KR   10-2016-0108465   9/2016
KR   10-2017-0049450   5/2017
(Continued)

OTHER PUBLICATIONS

Office Action dated Apr. 5, 2022 for Korean Patent Application No. 10-2022-0018443 and its English machine translation by Google Translate.
(Continued)

*Primary Examiner* — Pamela Rodriguez
(74) *Attorney, Agent, or Firm* — WOMBLE BOND DICKINSON (US) LLP

(57) ABSTRACT

Disclosed herein a brake apparatus may include a first motor configured to provide a rotational force to a first brake to brake a first wheel of a vehicle; a first drive configured to control a driving current of the first motor; a second motor configured to provide a rotational force to a second brake to brake a second wheel of the vehicle; a second drive configured to control a driving current of the second motor; a first processor connected to the first and second drives through a first network; and a second processor connected to the first and second drives through a second network separated from the first network.

16 Claims, 11 Drawing Sheets

(52) U.S. Cl.
CPC ..... *B60T 2240/00* (2013.01); *B60T 2270/402* (2013.01); *B60T 2270/404* (2013.01); *B60T 2270/82* (2013.01)

(58) Field of Classification Search
CPC .. B60T 2270/82; B60T 2240/00; B60T 13/74; B60T 13/741; B60T 7/06; B60T 17/22; B60T 17/221; B60T 2270/413
See application file for complete search history.

(56) References Cited

U.S. PATENT DOCUMENTS

| | | | |
|---|---|---|---|
| 2020/0223408 A1* | 7/2020 | Goto | B60T 13/662 |
| 2021/0009096 A1* | 1/2021 | Mahnkopf | B60T 13/662 |
| 2023/0391303 A1* | 12/2023 | Kim | B60T 8/92 |

FOREIGN PATENT DOCUMENTS

| | | |
|---|---|---|
| KR | 10-2020-0140752 | 12/2020 |
| WO | 2005/110829 | 11/2005 |

OTHER PUBLICATIONS

Extended European Search Report dated Jan. 25, 2023 for European Patent Application No. 22167205.8.

* cited by examiner

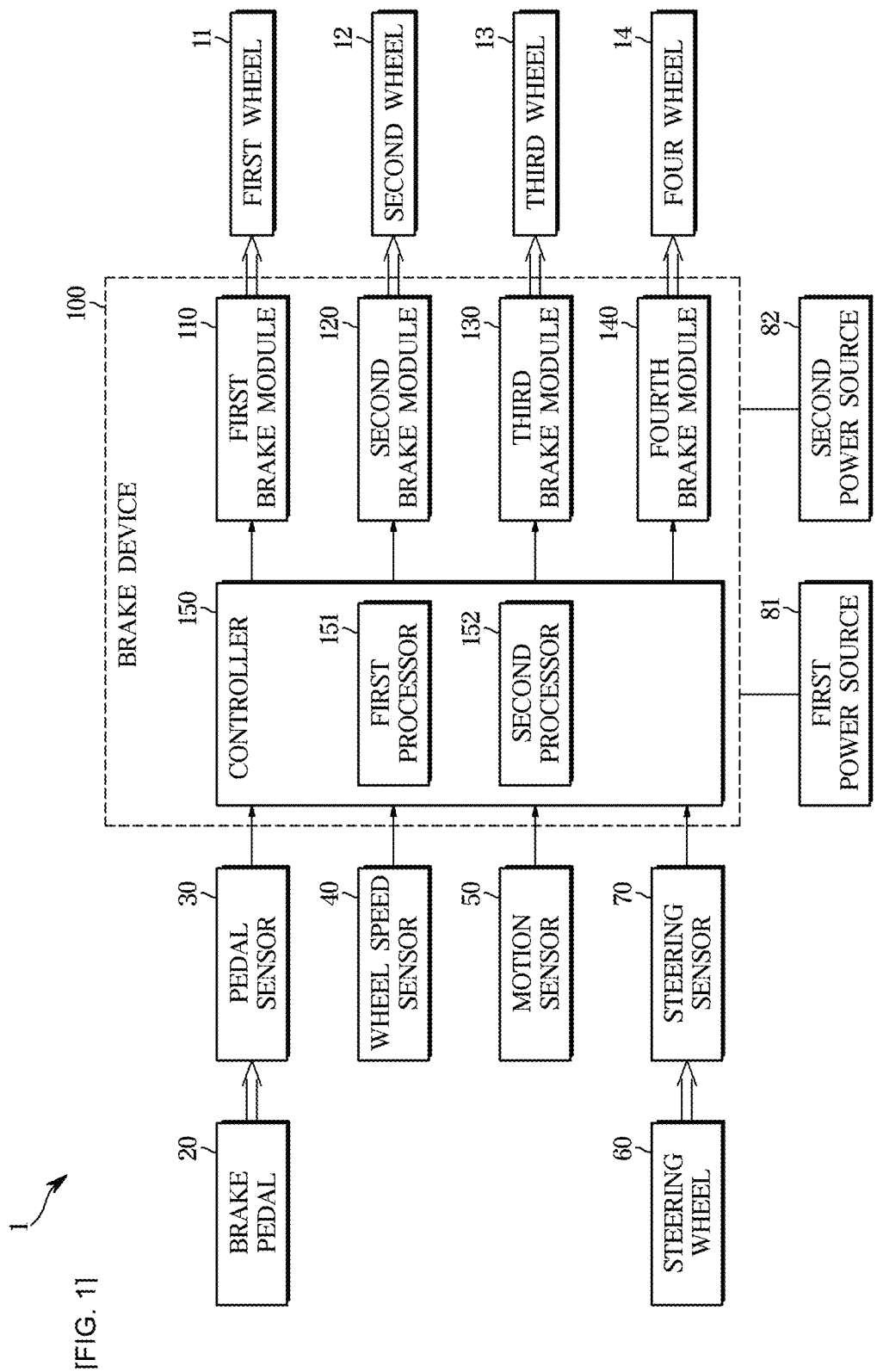
[FIG. 1]

[FIG. 2]
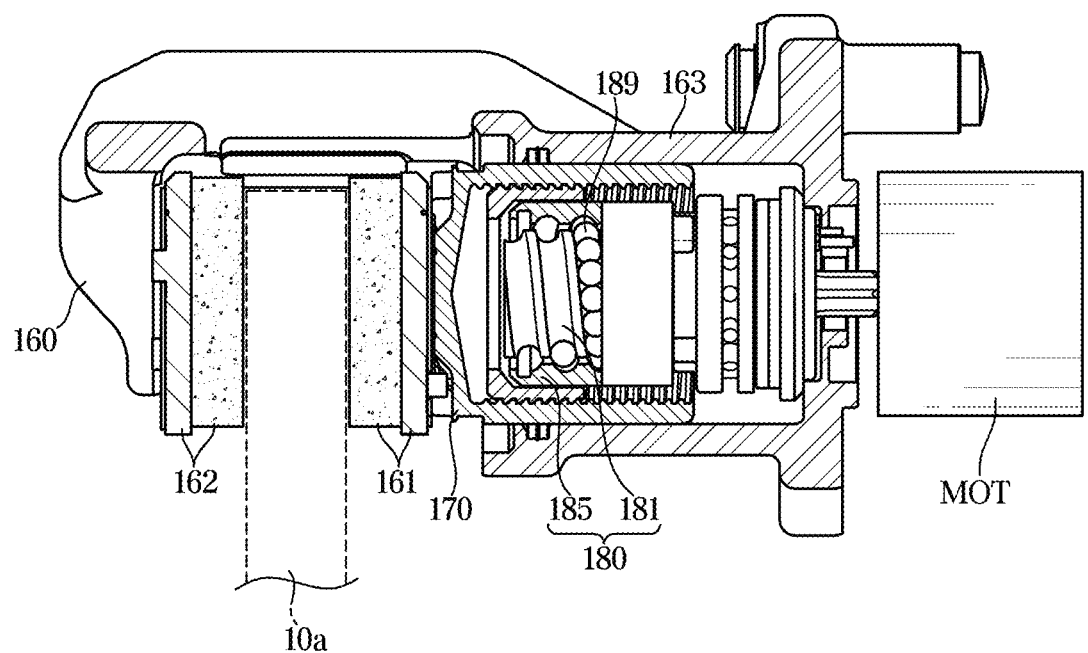

[FIG. 3]
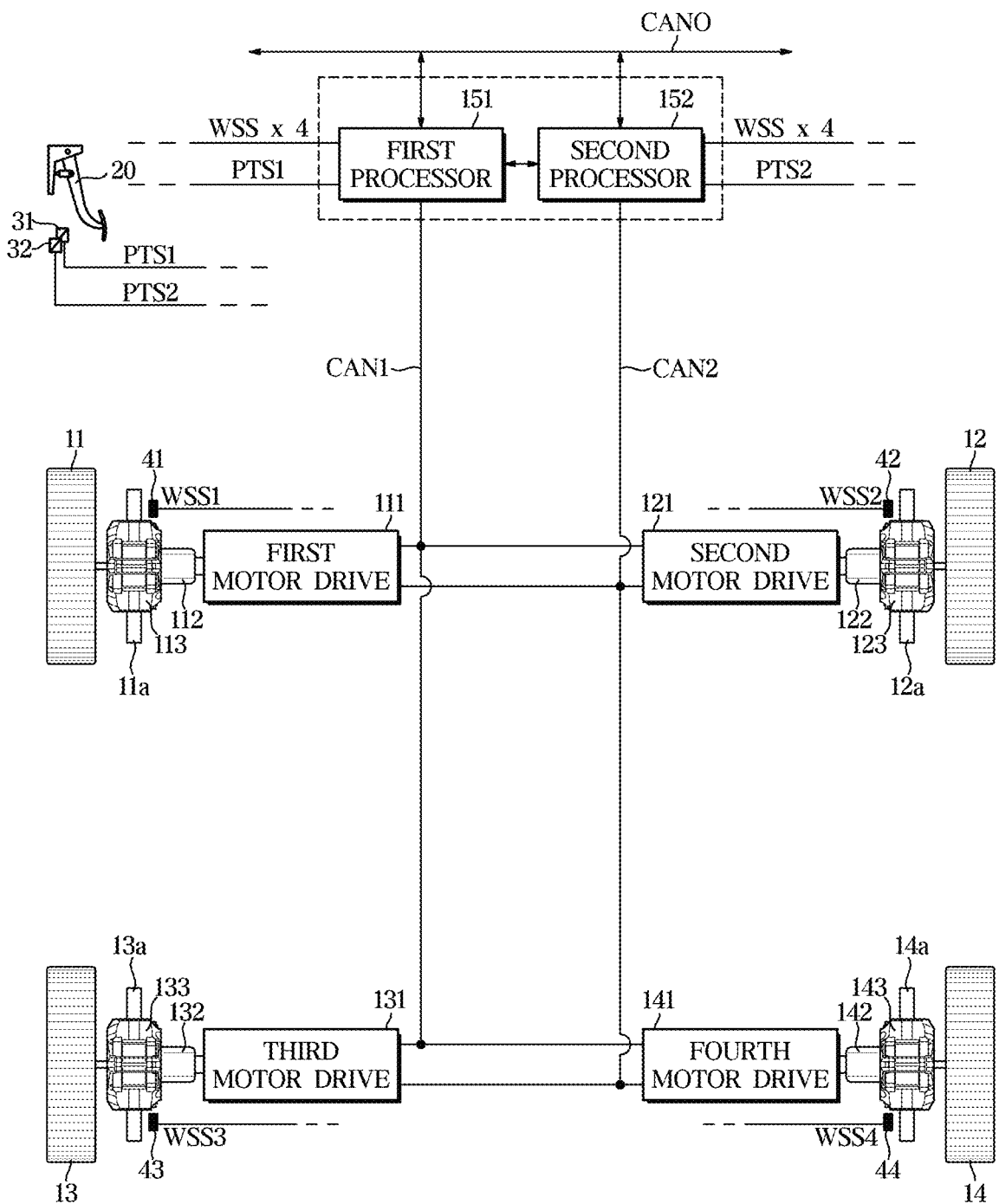

[FIG. 4]
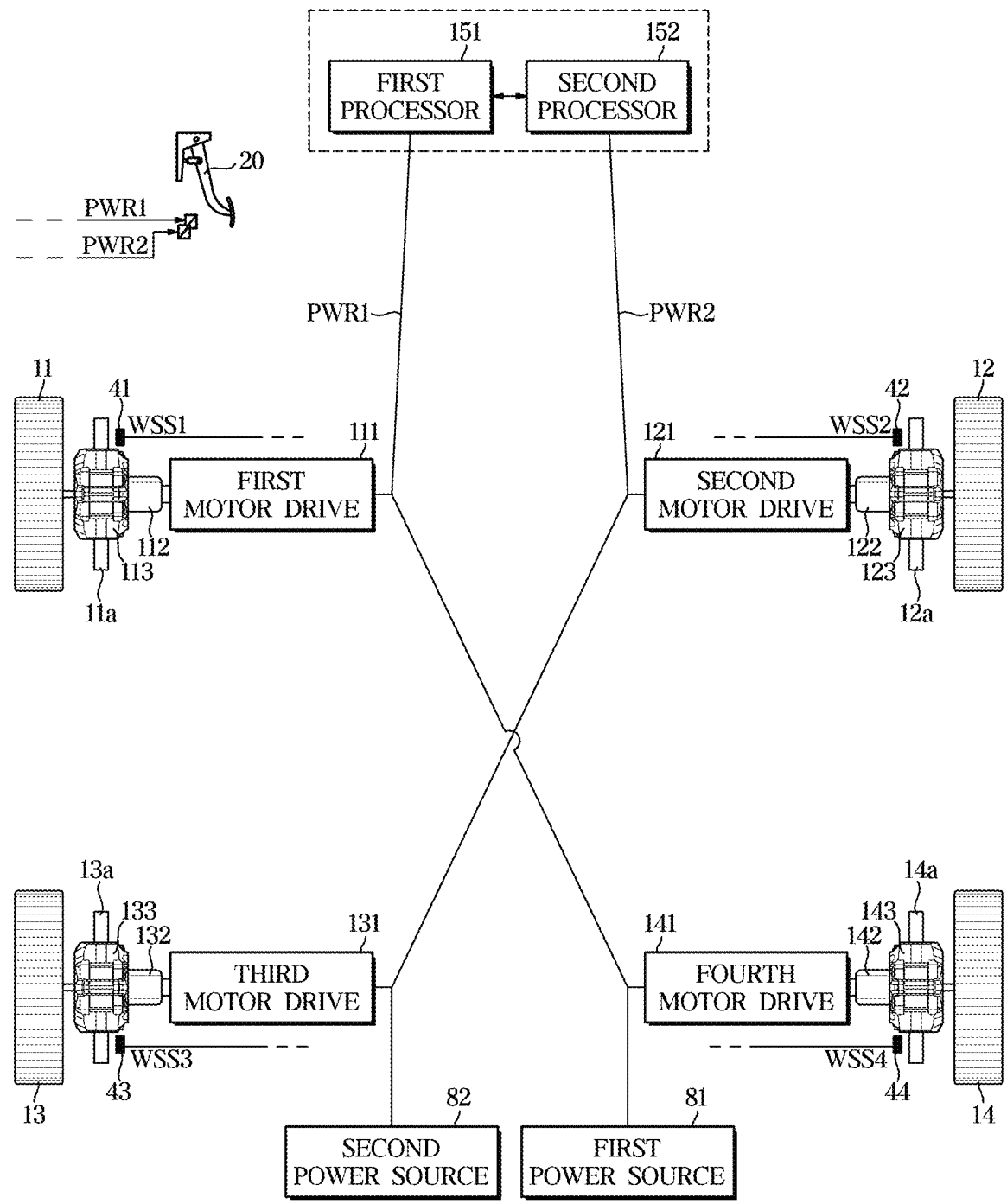

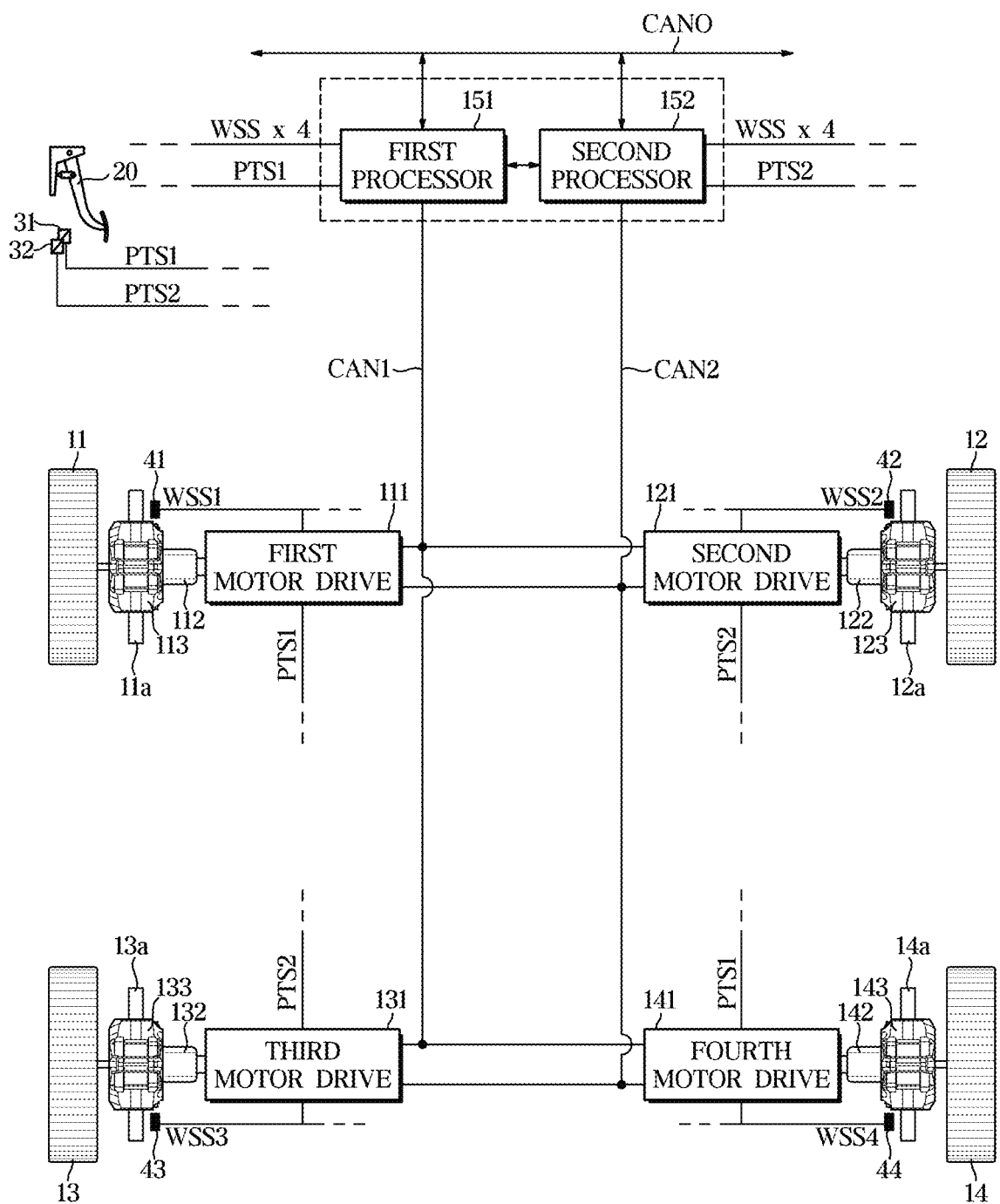
[FIG. 5]

[FIG. 6]
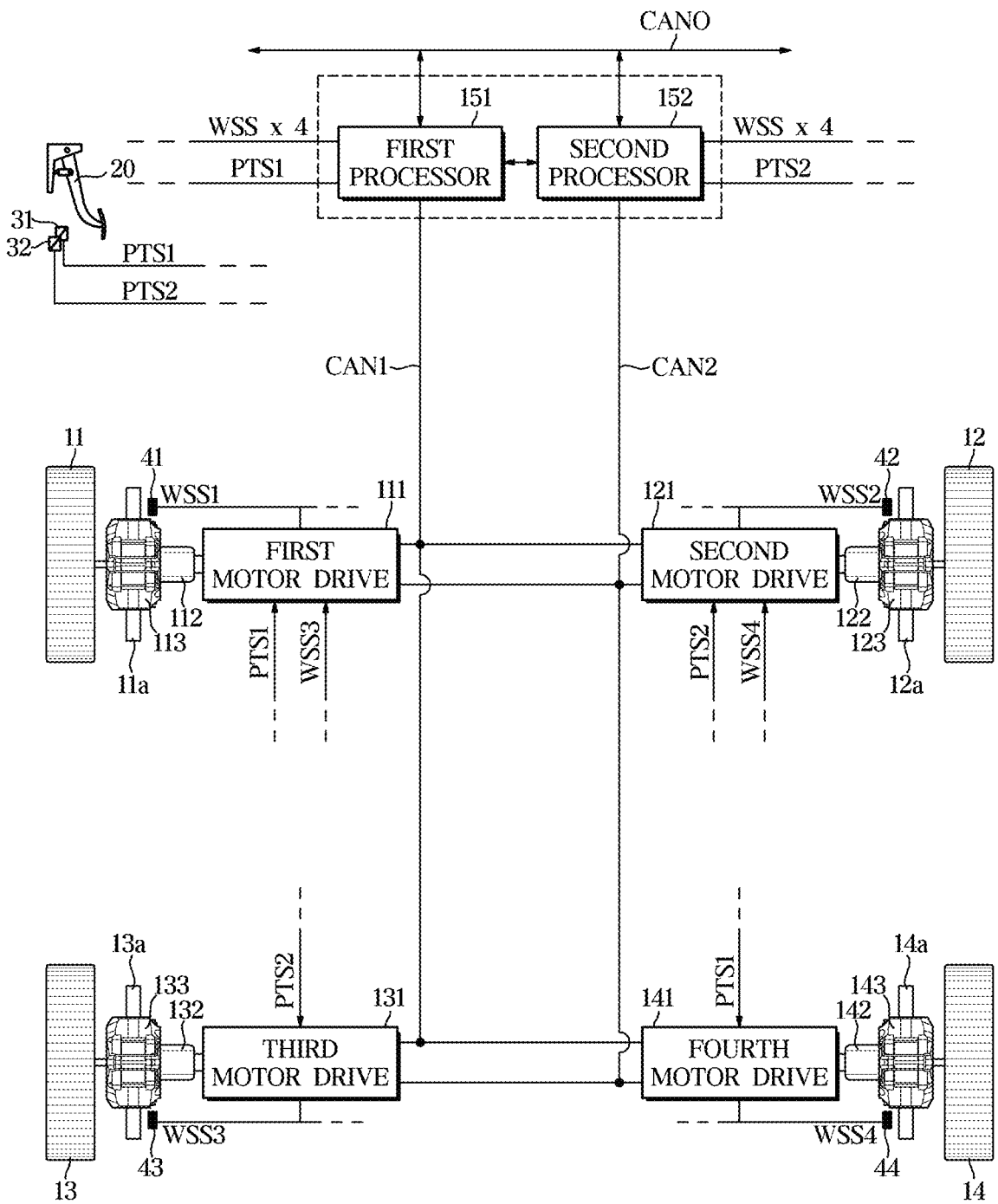

[FIG. 7]
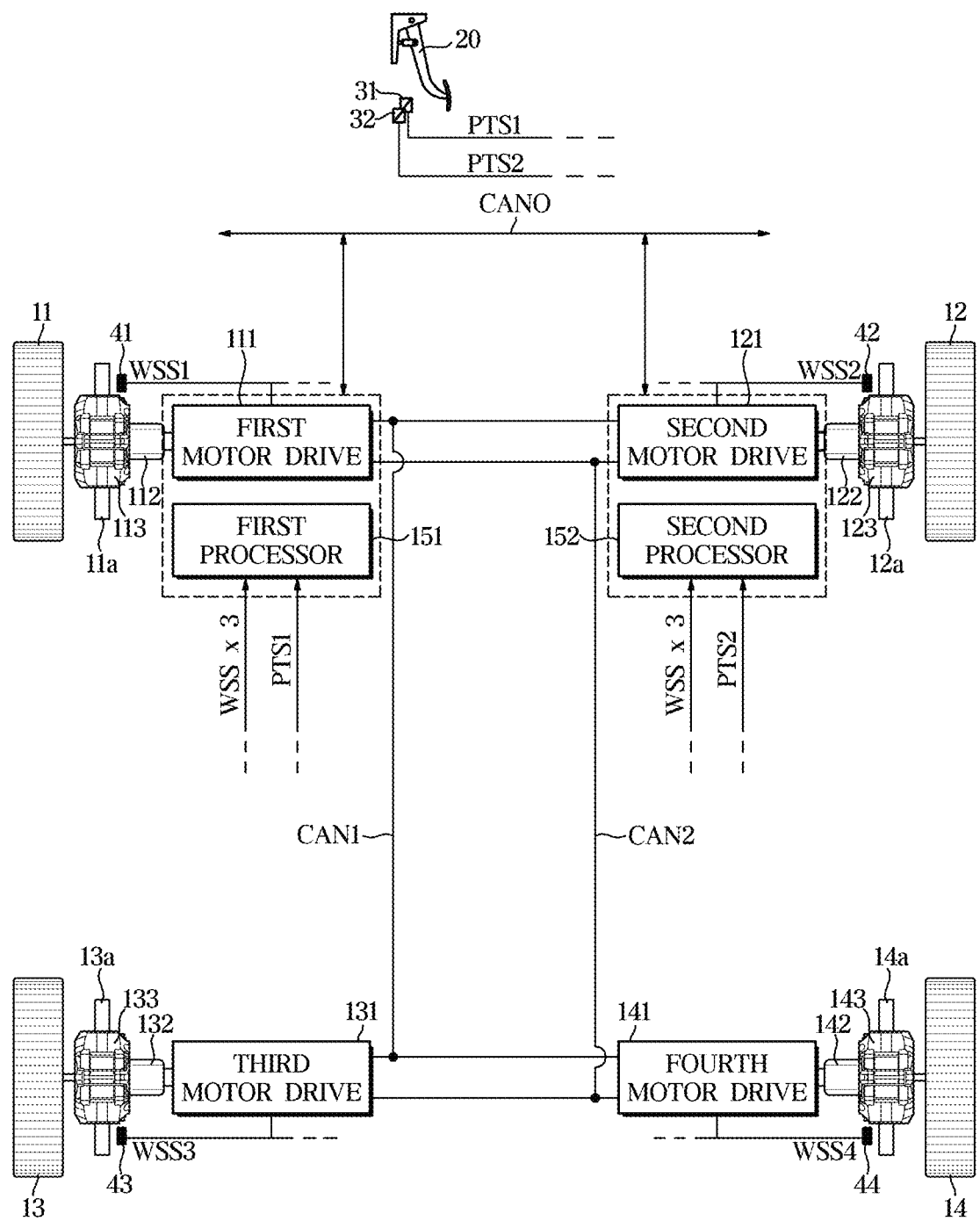

[FIG. 8]
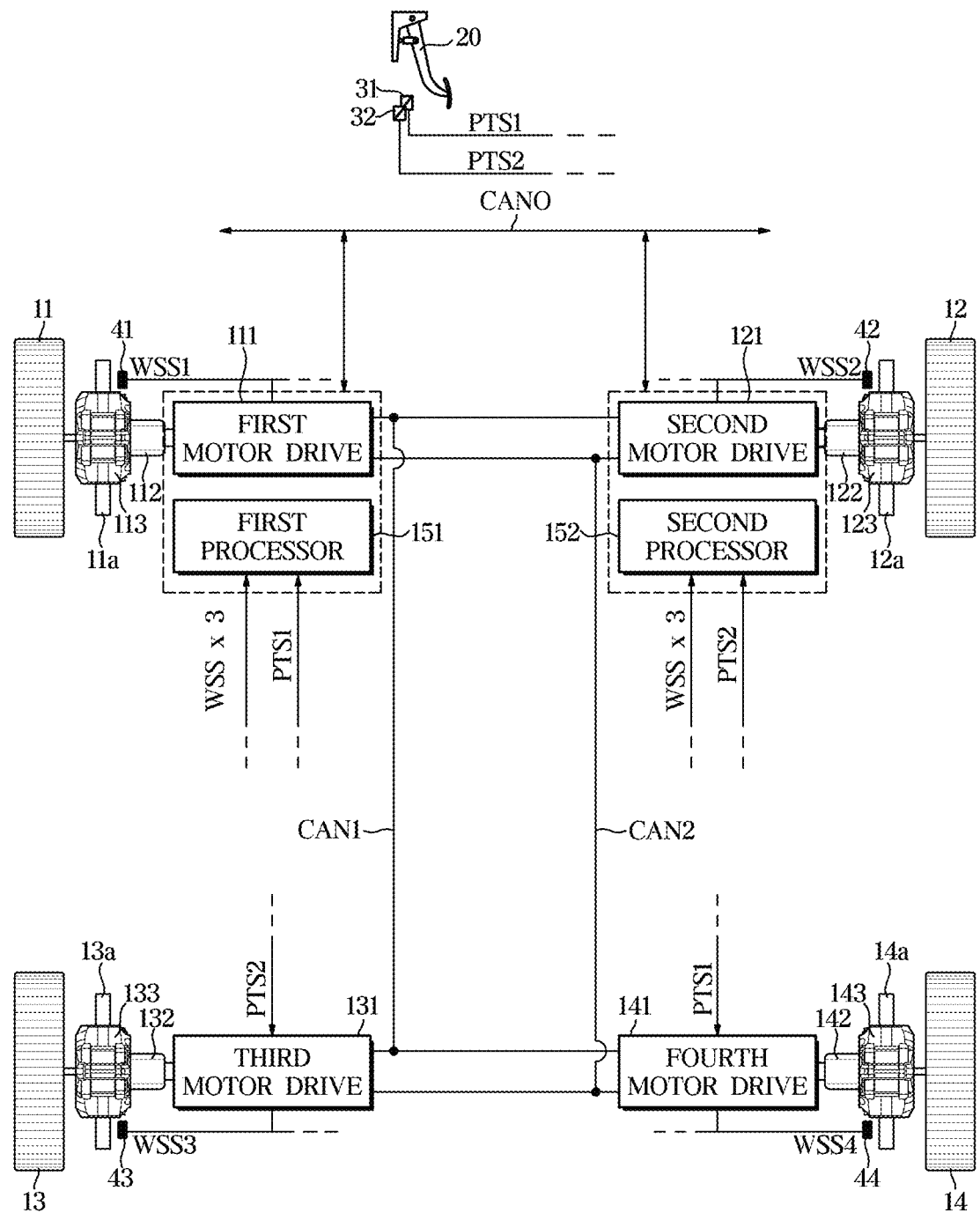

[FIG. 9]
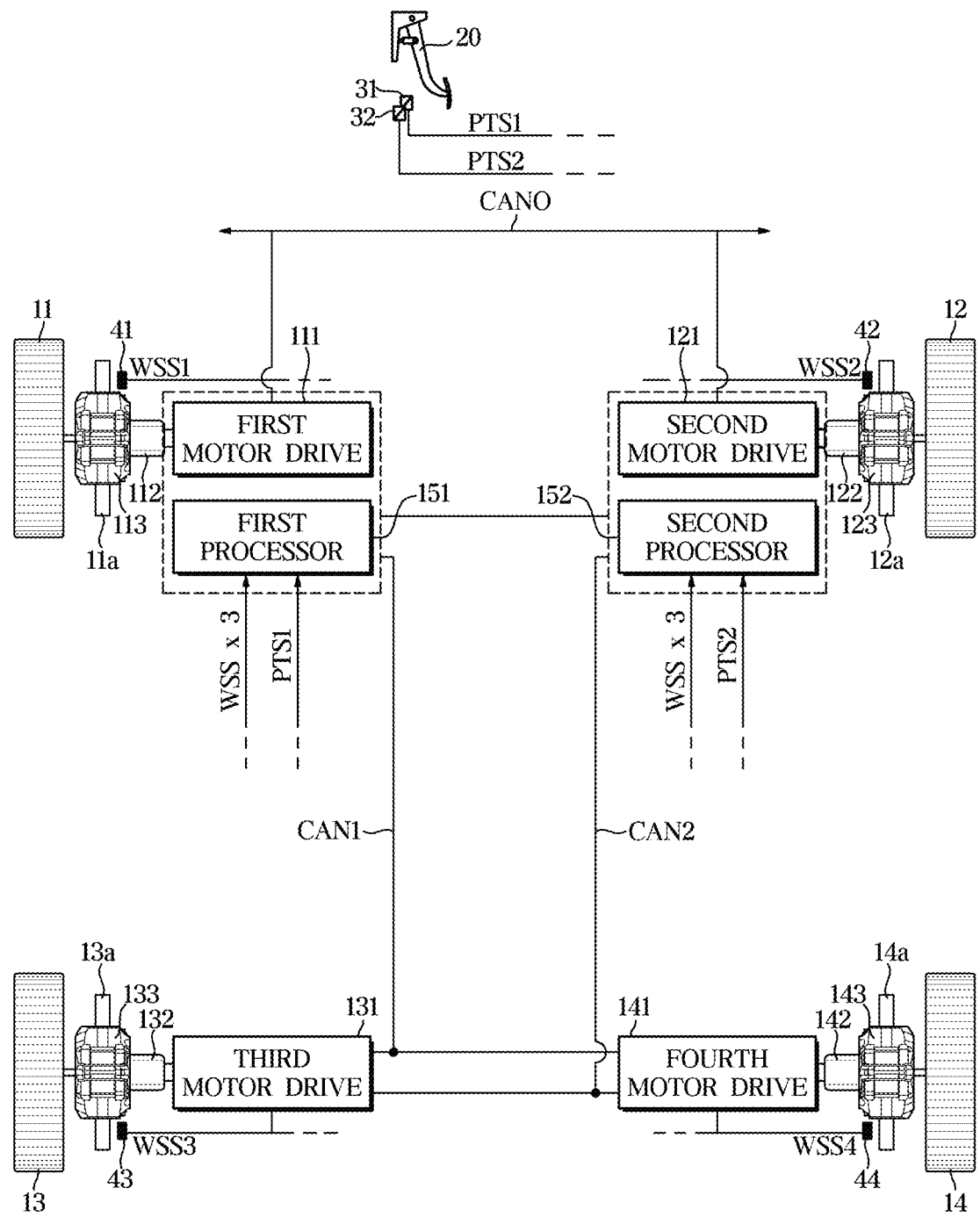

[FIG. 10]
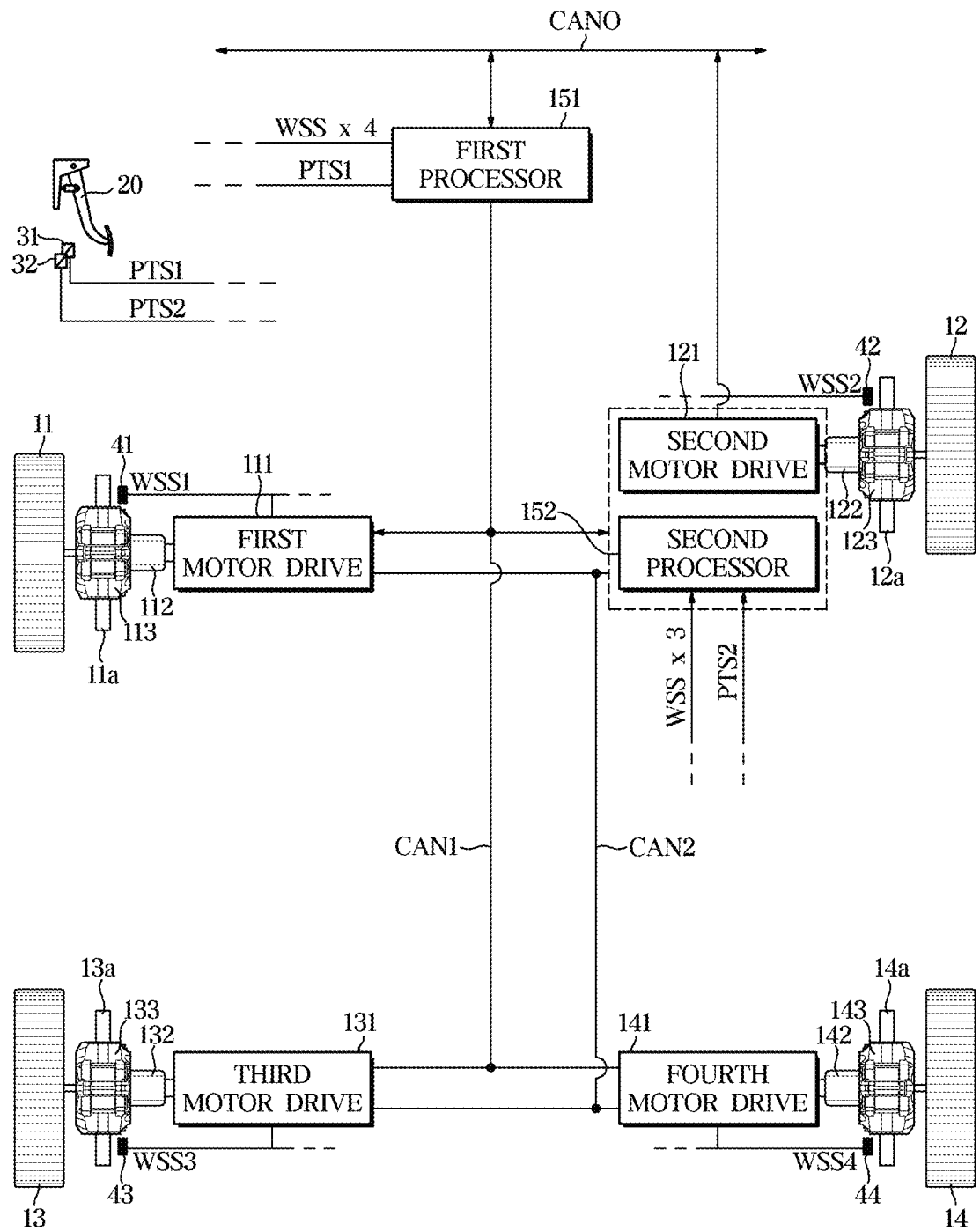

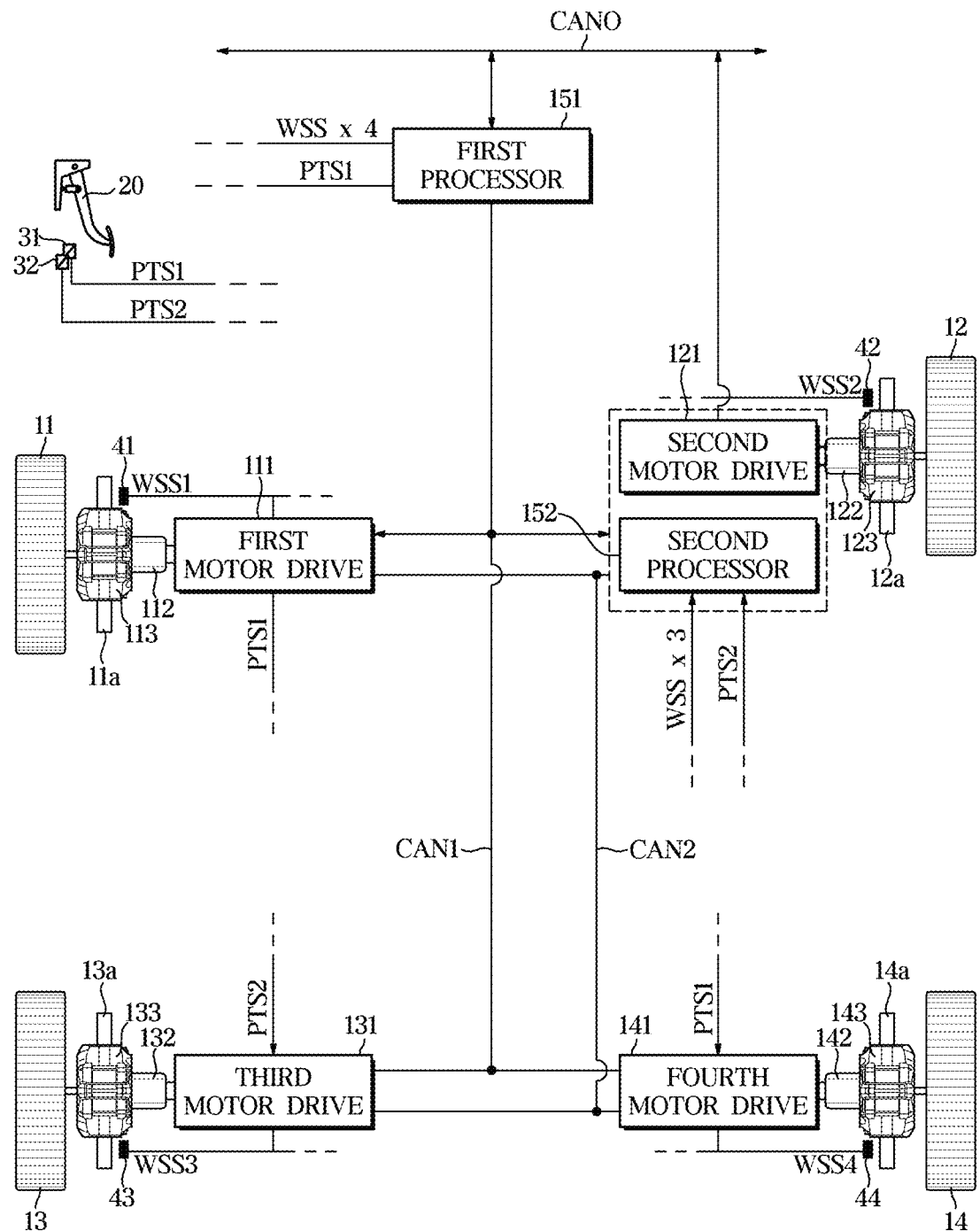
[FIG. 11]

BRAKE APPARATUS

CROSS-REFERENCE TO RELATED APPLICATION(S)

This application is based on and claims priority under 35 U.S.C. § 119 to Korean Patent Application No. 10-2021-0045403, filed on Apr. 7, 2021, No. 10-2021-0045329, filed on Apr. 7, 2021, and No. 10-2022-0018443, filed on Feb. 11, 2022 in the Korean Intellectual Property Office, the disclosure of which is incorporated herein by reference in its entirety.

TECHNICAL FIELD

The disclosure relates to a brake apparatus, and more particularly, to an electromechanical brake apparatus.

BACKGROUND

A vehicle is essentially equipped with a brake device for performing braking, and the brake devices for braking the vehicle in various ways have been proposed for safety of a driver and a passenger.

A hydraulic brake device includes a wheel cylinder provided on each of wheels of a vehicle. The hydraulic brake device generates hydraulic pressure in response to a braking force required by a driver, and provides the generated hydraulic pressure to the wheel cylinders. The hydraulic pressure provided to the wheel cylinders may provide a braking torque to the wheels of the vehicle.

An electromechanical brake device includes a braking motor provided on each of the wheels of a vehicle. The electromechanical brake device transmits an electrical signal to the braking motor in response to a braking force required by a driver. The motor may mechanically provide a braking torque to the wheels of the vehicle in response to the received electrical signal.

Unlike the hydraulic brake devices, in the electromechanical brake devices, a brake device that provides a braking torque to the wheels and a control device that controls the brake device are not hydraulically or mechanically connected to each other. Accordingly, the electromechanical brake devices are more sensitive to damage or errors in an electrical system of the vehicle (e.g., voltage drop of a battery, short circuit due to overheating, and the like).

SUMMARY

An aspect of the disclosure is to provide an electromechanical brake apparatus that is robust against damage or errors in an electrical system of a vehicle.

Another aspect of the disclosure is to provide an electromechanical brake apparatus capable of providing redundancy to electrical devices such as a power circuit, a sensor, and a processor.

Another aspect of the disclosure is to provide an electromechanical brake apparatus in which auxiliary processors provided in each wheel may independently control a motor provided in each wheel in preparation for damage or errors of a main processor.

Additional aspects of the disclosure will be set forth in part in the description which follows and, in part, will be obvious from the description, or may be learned by practice of the disclosure.

In accordance with an aspect of the disclosure, a brake apparatus includes a first motor configured to provide a rotational force to a first brake to brake a first wheel of a vehicle; a first drive configured to control a driving current of the first motor; a second motor configured to provide a rotational force to a second brake to brake a second wheel of the vehicle; a second drive configured to control a driving current of the second motor; a first processor connected to the first and second drives through a first network; and a second processor connected to the first and second drives through a second network separated from the first network; wherein the first processor is configured to transmit a braking signal to the first and second drives through the first network based on an output of a first pedal sensor, and the second processor is configured to transmit a braking signal to the first and second drives through the second network based on an output of a second pedal sensor during an abnormal state of the first processor.

The first processor and the first drive may be configured to obtain power from a first power source of the vehicle; and the second processor and the second drive may be configured to obtain power from a second power source of the vehicle.

The first drive may be configured to control the driving current of the first motor to brake the first wheel based on the output of the first pedal sensor during the abnormal state of the first and second processors; and the second drive may be configured to control the driving current of the second motor to brake the second wheel based on the output of the second pedal sensor during the abnormal state of the first and second processors.

Each of the first and second processors may be configured to receive an output of a first wheel speed sensor for measuring rotational speed of the first wheel and an output of a second wheel speed sensor for measuring rotational speed of the second wheel, and the first processor may be configured to transmit the braking signals to the first and second drives to intermittently brake the first and second wheels based on the outputs of the first and second wheel speed sensors.

The first drive may be configured to receive an output of a first wheel speed sensor for measuring rotational speed of the first wheel, the second drive may be configured to receive an output of a second wheel speed sensor for measuring rotational speed of the second wheel, the first drive may be configured to brake intermittently the first wheel based on the output of the first wheel speed sensor, and the second drive may be configured to brake intermittently the second wheel based on the output of the second wheel speed sensor.

The first processor may be configured to integrate with the second processor and to separate from the first drive and the second drive.

The first processor may be configured to integrate with the first drive, and the second processor may be configured to integrate with the second drive.

The first processor may be configured to separate from the first drive and the second drive, and the second processor may be configured to integrate with the second drive.

In accordance with another aspect of the disclosure, a brake apparatus includes a first motor configured to provide a rotational force to a first brake to brake a first wheel of a vehicle; a first drive configured to control a driving current of the first motor; a second motor configured to provide a rotational force to a second brake to brake a second wheel of the vehicle; a second drive configured to control a driving current of the second motor; a first processor connected to the first and second drives through a first network; and a second processor connected to the first and second drives through a second network separated from the first network; wherein the first and second drives are configured to receive a braking signal from at least one of the first and second processors, the first drive is configured to control the driving current of the first motor to brake the first wheel based on an output of a first pedal sensor during an abnormal state of the first and second processors, and the second drive is configured to control the driving current of the second motor to brake the second wheel based on an output of a second pedal sensor during the abnormal state of the first and second processors.

The first processor may be configured to transmit the braking signal to the first and second drives through the first network based on the output of the first pedal sensor, and the second processor may be configured to transmit the braking signal to the first and second drives through the second network based on the output of the second pedal sensor during the abnormal state of the first processor.

The first processor and the first drive may be configured to obtain power from a first power source of the vehicle, and the second processor and the second drive may be configured to obtain power from a second power source of the vehicle.

Each of the first and second processors may be configured to receive an output of a first wheel speed sensor for measuring rotational speed of the first wheel and an output of a second wheel speed sensor for measuring rotational speed of the second wheel, and the first processor may be configured to transmit the braking signal to the first and second drives to intermittently brake the first and second wheels based on the outputs of the first and second wheel speed sensors.

The first drive may be configured to receive an output of a first wheel speed sensor for measuring rotational speed of the first wheel, the second drive may be configured to receive an output of a second wheel speed sensor for measuring rotational speed of the second wheel, the first drive may be configured to brake intermittently the first wheel based on the output of the first wheel speed sensor, and the second drive may be configured to brake intermittently the second wheel based on the output of the second wheel speed sensor.

The first processor may be configured to integrate with the second processor and separate from the first drive and the second drive brake.

The first processor may be configured to integrate with the first drive, and the second processor may be configured to integrate with the second drive.

The first processor may be configured to separate from the first drive and the second drive, and the second processor may be configured to integrate with the second drive.

In accordance with another aspect of the disclosure, a brake apparatus includes a first motor configured to provide a rotational force to a first brake to brake a first wheel of a vehicle; a first drive configured to control a driving current of the first motor; a second motor configured to provide a rotational force to a second brake to brake a second wheel of the vehicle; a second drive configured to control a driving current of the second motor; a first processor connected to the first and second drives through a first network; and a second processor connected to the first and second drives through a second network separated from the first network; wherein the first processor is configured to transmit a braking signal to the first and second drives through the first network based on an output of a first pedal sensor, the first drive is configured to brake intermittently the first wheel based on a output of a first wheel speed sensor that measures rotational speed of the first wheel, and the second drive is configured to brake intermittently the second wheel based on an output of a second wheel speed sensor that measures rotational speed of the second wheel.

The first processor and the first drive may be configured to obtain power from a first power source of the vehicle, and the second processor and the second drive may be configured to obtain power from a second power source of the vehicle.

The first drive may be configured to control the driving current of the first motor to brake the first wheel based on the output of the first pedal sensor during an abnormal state of the first and second processors; and the second drive may be configured to control the driving current of the second motor to brake the second wheel based on an output of a second pedal sensor during the abnormal state of the first and second processors.

The first processor may be configured to transmit the braking signal to the first and second drives to intermittently brake the first and second wheels based on the outputs of the first and second wheel speed sensors.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a view illustrating a configuration of a vehicle according to an embodiment of the disclosure;

FIG. 2 is a view illustrating an example of an electromechanical brake included in a vehicle according to an embodiment of the disclosure;

FIG. 3 is a view illustrating an example of a connection relationship between components included in a brake device according to an embodiment of the disclosure;

FIG. 4 is a view illustrating an example of a power supply between components included in a brake device according to an embodiment of the disclosure;

FIG. 5 is a view illustrating an example of a connection relationship between components included in a brake device according to an embodiment of the disclosure;

FIG. 6 is a view illustrating an example of a connection relationship between components included in a brake device according to an embodiment of the disclosure;

FIG. 7 is a view illustrating an example of a connection relationship between components included in a brake device according to an embodiment of the disclosure;

FIG. 8 is a view illustrating an example of a connection relationship between components included in a brake device according to an embodiment of the disclosure;

FIG. 9 is a view illustrating an example of a connection relationship between components included in a brake device according to an embodiment of the disclosure;

FIG. 10 is a view illustrating an example of a connection relationship between components included in a brake device according to an embodiment of the disclosure; and FIG. 11 is a view illustrating an example of a connection relationship between components included in a brake device according to an embodiment of the disclosure.

DETAILED DESCRIPTION

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software or hardware. Terms such as "~ unit", "~ group", "~ block", "~ member", and "~ module" may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

FIG. 1 is a view illustrating a configuration of a vehicle according to an embodiment of the disclosure. FIG. 2 is a view illustrating an example of an electromechanical brake included in a vehicle according to an embodiment of the disclosure.

A vehicle 1 has a body that forms its exterior and accommodates a driver and/or luggage, a chassis comprising components of the vehicle 1 except for the body, and wheels 11, 12, 13, and 14 that rotate so that the vehicle 1 can move.

The wheels 11, 12, 13, and 14, for example, may include a first wheel 11 provided on a front left side of the vehicle 1, a second wheel 12 provided on a front right side of the vehicle 1, a third wheel 13 provided on a rear left side of the vehicle 1, and/or a fourth wheel 14 provided on a rear right side of the vehicle 1. The number of wheels 11, 12, 13, and 14 is not limited to four.

Furthermore, as shown in FIG. 1, the vehicle 1 may include a brake pedal 20 that obtains an input related to braking of a driver, a pedal sensor 30 that detects movement of the brake pedal 20, a wheel speed sensor 40 that detects a rotational speed of the wheels 11, 12, 13, and 14, a steering wheel 60 that obtains an input related to steering of a driver, a steering sensor 70 that detects rotation of the steering wheel 60, a brake device 100 that provides a braking force for stopping the vehicle 1 to the wheels 11, 12, 13, and 14, and a first power source 81 and a second power source 82 that supply power to the brake device 100, etc.

The brake pedal 20 may be provided in a lower portion of a cabin, for example, so that the driver may control the brake pedal with his or her feet. The driver may depress the brake pedal 20 as an intention to brake the vehicle 1. The brake pedal 20 may move away from a reference position in response to the driver's intention to brake.

The pedal sensor 30 is installed near the brake pedal 20, and may measure the movement of the brake pedal 20 by the driver's intention to brake. For example, the pedal sensor 30 may detect a movement distance and/or movement speed from a reference position of the brake pedal 20.

The pedal sensor 30 may be electrically connected to the brake device 100, and may provide an electrical signal to the brake device 100. For example, the pedal sensor 30 may be directly connected to the brake device 100 via hard wires or may be connected to the brake device 100 via a communication network. Furthermore, the pedal sensor 30 may provide an electrical signal corresponding to the movement distance and/or movement speed of the brake pedal 20 to the brake device 100.

The pedal sensor 30 may include a plurality of pedal sensors in preparation for damage or errors in an electrical system of the vehicle. For example, the pedal sensor 30 may include a first pedal sensor and preliminarily the second pedal sensor. The first and second pedal sensors may provide an electrical signal corresponding to the movement distance and/or movement speed of the brake pedal 20 to the brake device 100, respectively.

The wheel speed sensor 40 may include a plurality of wheel speed sensors respectively installed on the wheels 11, 12, 13 and 14. The plurality of wheel speed sensors may independently detect the rotational speed of the wheels 11, 12, 13 and 14, respectively.

The wheel speed sensor 40 may be electrically connected to the brake device 100, and may provide an electrical signal to the brake device 100. For example, each of the plurality of wheel speed sensors may be directly connected to the brake device 100 through the hard wires or may be connected to the brake device 100 through the communication network. Each of the plurality of wheel speed sensors may provide an electrical signal corresponding to the rotational speed of the wheels 11, 12, 13, and 14 to the brake device 100.

A motion sensor 50 is installed approximately at a center of the vehicle 1, and may include an acceleration sensor and a gyro sensor capable of detecting a linear movement and a rotational movement of the vehicle 1. The acceleration sensor may detect the linear movement of the vehicle 1 and the motion sensor 50. For example, the acceleration sensor may measure an acceleration, a speed, a moving displacement, and a moving direction of the vehicle 1 while the vehicle 1 is moving linearly. The gyro sensor may detect the rotational movement of the vehicle 1 and the motion sensor 50. For example, the gyro sensor may measure angular acceleration, angular velocity, and/or a rotational displacement of the vehicle 1 while the vehicle 1 rotates.

The motion sensor 50 may detect a yaw rate representing the rotation of the vehicle 1 about an axis perpendicular to the ground on which the vehicle 1 travels.

The motion sensor 50 may be electrically connected to the brake device 100, and may provide an electrical signal to the brake device 100. The motion sensor 50 may be directly connected to the brake device 100 through the hard wires or may be connected to the brake device 100 through the communication network. The motion sensor 50 may provide an electrical signal corresponding to the yaw rate of the vehicle 1 to the brake device 100.

The steering wheel 60 may be provided in front of the driver seat, for example, so that the driver may control the steering wheel by hand. The driver may rotate the steering wheel 60 as a steering intention to steer the vehicle 1. The steering wheel 60 may rotate clockwise or counterclockwise in response to the driver's intention to rotate.

The steering sensor 70 is installed near a column connected to the steering wheel 60, and may measure the rotation of the steering wheel 60 by the driver's intention to steer. For example, the steering sensor 70 may detect an angle at which the steering wheel 60 is rotated from a reference rotation position.

The steering sensor 70 may be electrically connected to the brake device 100 and may provide an electrical signal to the brake device 100. For example, the steering sensor 70 may be directly connected to the brake device 100 through the hard wires or may be connected to the brake device 100 through the communication network. Furthermore, the steering sensor 70 may provide an electrical signal corresponding to a rotation angle of the steering wheel 60 to the brake device 100.

The brake device 100 may include electromechanical brake modules 110, 120, 130, and 140 (hereinafter referred to as brake) that are installed on the respective wheels 11, 12, 13 and 14, and a controller 150 for controlling each of the brake modules 110, 120, 130, and 140.

The brake modules 110, 120, 130, and 140 may brake the wheels 11, 12, 13 and 14, respectively and brake the vehicle 1. For example, the brake modules 110, 120, 130, and 140 may include the first brake module 110 for braking the first wheel 11, and the second brake module 120 for braking the second wheel 12, the third brake module 130 for braking the third wheel 13, and/or the fourth brake module 140 for braking the fourth wheel 14. The number of brake modules 110, 120, 130, and 140 is not limited to four.

Each of the brake modules 110, 120, 130, and 140 may operate only depending on a braking signal output from the controller 150 without being mechanically or fluidly connected to the brake pedal 20.

For example, as shown in FIG. 2, each of the brake modules 110, 120, 130, and 140 may be a caliper brake.

The caliper brake may include a pair of pad plates 161 and 162 installed to press a brake disc 10a rotating together with the wheels 11, 12, 13 and 14, a caliper housing 160 that operates the pair of pad plates 161 and 162, a piston 170 installed to move forward and backward inside the caliper housing 160, a powertrain 180 that converts a rotational driving force for moving the piston 170 into a linear driving force and transmits the linear driving force to the piston 170, and a brake motor (MOT) that generates a rotational driving force for moving the piston 170.

The piston 170 may be provided in a cup shape with an open rear side (the right side of FIG. 2), and is slidably inserted inside a cylinder part 163. Furthermore, the piston 170 may receive power through the powertrain 180 to press the inner pad plate 161 against the brake disk 10a.

The powertrain 180 may include a spindle 181 that rotates by receiving a driving force from the MOT, a nut that is disposed inside the piston 170 and is screw-connected to the spindle 181 to advance with the piston 170 by rotation of the spindle 181 in a first direction or retracts with the piston 170 by rotation of the spindle 181 in a second direction, and a plurality of balls 189 interposed between the spindle 181 and the nut 185. The powertrain 180 may be provided as a ball-screw type conversion device that converts a rotational motion of the spindle 181 into a linear motion.

The rotational motion of the MOT may be converted into the linear motion of the piston 170 by the powertrain 180. The pair of pad plates 161 and 162 are pressed against the brake disk 10a by the linear motion of the piston 170, and the wheels 11, 12, 13, and 14 may be braked by friction between the pair of pad plates 161 and 162 and the brake disk 10a.

FIG. 2 is a view illustrating a caliper brake as an example of an electromechanical brake, but the brake is not limited to the caliper brake. For example, the electromechanical brake may be a drum brake.

As such, each of the brake modules 110, 120, 130, and 140 may include the MOT and a driving circuit for driving the MOT.

Furthermore, each of the brake modules 110, 120, 130, and 140, without being mechanically or fluidly connected to the brake pedal 20, may brake the wheels 11, 12, 13, and 14, respectively only depending on the operation of the MOT. Accordingly, mechanisms or hydraulic circuits extending from the brake pedal 20 to each of the brake modules 110, 120, 130 and 140 may be omitted.

The controller 150 may receive output signals of the pedal sensor 30, the wheel speed sensor 40, the motion sensor 50, and/or the steering sensor 70, and control the operation of the brake modules 110, 120, 130, and 140.

The controller 150 may provide braking signals to the brake modules 110, 120, 130, and 140 in order to brake the vehicle 1 based on an electrical signal output from the pedal sensor 30. For example, the controller 150 may identify a braking force (or braking acceleration) for braking the vehicle 1 based on the output signal of the pedal sensor 30, and provide the braking signal corresponding to the identified braking force (or the braking acceleration) to the brake modules 110, 120, 130, and 140.

The controller 150 may distribute the braking force to the brake modules 110, 120, 130, and 140 in order to brake the vehicle 1 based on the electrical signal output from the pedal sensor 30. For example, the controller 150 may distribute the braking force required by the driver to the brake modules 110, 120, 130, and 140, and provide the braking signal corresponds to the braking force distributed to each of the brake modules 110, 120, 130, and 140. As such, the brake device 100 may include electronic brake force distribution (EBD).

The controller 150 may provide the braking signal to the brake modules 110, 120, 130, and 140 in order to temporarily allow the rotation of the wheels 11, 12, 13 and 14 based on an electrical signal output from the wheel speed sensor 40. For example, the controller 150 may identify a slip of the wheels 11, 12, 13, and 14 based on an output signal of the wheel speed sensor 40 while braking the vehicle 1. The controller 150 may provide the brake modules 110, 120, 130, and 140 with the braking signal that temporarily allows the rotation of the wheels 11, 12, 13 and 14 in order to eliminate the slip of the wheels 11, 12, 13, and 14, in response to the slip of the wheels 11, 12, 13, and 14. As such, the brake device 100 may include an anti-lock braking system (ABS).

The controller 150 may provide the braking signal to the brake modules 110, 120, 130, and 140 in order to temporarily brake the wheels 11, 12, 13, and 14 without the user's intention to brake based on the electrical signal output from the wheel speed sensor 40. For example, the controller 150 may identify a spin of the wheels 11, 12, 13, and 14 based on the output signal of the wheel speed sensor 40 while the vehicle 1 is traveling. The controller 150 may provide the brake modules 110, 120, 130, and 140 with the braking signal that temporarily brakes the wheels 11, 12, 13, and 14 in order to release the spin of the wheels 11, 12, 13, and 14, in response to the spin of the wheels 11, 12, 13, and 14. As such, the brake device 100 may include a traction control system (TCS).

The controller 150 may provide the braking signal to the brake modules 110, 120, 130, and 140 14 without the user's intention to brake based on electrical signals output from the motion sensor 50 and/or the steering sensor 70. For example, the controller 150 may identify a reference route (a reference rotation route) of the vehicle 1 based on the output signal of the steering sensor 70 during steering of the vehicle 1, and may identify a driving route (a rotational driving route) of the vehicle 1 based on the output signal of the motion sensor 50. The controller 150 may identify oversteering or understeering of the vehicle 1 based on the reference route and the driving route. The controller 150 may provide the braking signal that temporarily brakes the wheels 11, 12, 13, and 14 to the brake modules 110, 120, 130, and 140 based on the oversteering and/or understeering. As such, the brake device 100 may include an electronic stability control (ESC).

The controller 150 may provide a parking signal to the brake modules 110, 120, 130, and 140 to prevent the rotation of the wheels 11, 12, 13 and 14 in response to a driver's parking instruction. As such, the brake device 100 may include an electric parking brake (EPB).

The controller 150 may include processors 151 and 152 for processing the output signals of the pedal sensor 30, the wheel speed sensor 40, the motion sensor 50, and/or the steering sensor 70, and outputting electrical signals corresponding to a service brake, EBD, ABS, TSC, ESC, and EPB, etc. to the brake modules 110, 120, 130, and 140

The controller 150 may include the plurality of processors 151 and 152 in preparation for damage or errors in the electrical system. For example, the controller 150 may include the first processor 151 and preliminarily second processor 152.

The first processor 151 may process the output signals of the pedal sensor 30, the wheel speed sensor 40, the motion sensor 50, and/or the steering sensor 70, identify a braking force (or a braking acceleration or fastening force) corresponding to the service brake, EBD, ABS, TSC, ESC, EPB, etc. based on the processed output signals, and output the braking signal corresponding to the braking force to the brake modules 110, 120, 130, and 140. The brake modules 110, 120, 130, and 140 may brake the wheels 11, 12, 13, and 14 according to the braking force corresponding to the braking signal.

The first processor 151 may communicate with the second processor 152. For example, the first processor 151 may periodically transmit an electrical signal to the second processor 152. The second processor 152 may identify a normal operating state of the first processor 151 based on receiving a periodic state signal from the first processor 151.

When the first processor 151 does not operate normally, the first processor 151 may not transmit the periodic state signal to the second processor 152. The second processor 152 may identify an abnormal operating state (e.g., damage, error, reset, or power cut off, etc.) of the first processor 151 based on not receiving the periodic state signal from the first processor 151 in a predetermined period.

The second processor 152 may also process the output signals of the pedal sensor 30, the wheel speed sensor 40, the motion sensor 50, and/or the steering sensor 70, and identify the braking force corresponding to the service brake, EBD, ABS, TSC, ESC, EPB, and the like based on the processed output signals. However, while the first processor 151 is in the normal operation, the second processor 152 may not output the braking signal to the brake modules 110, 120, 130, and 140, or the brake modules 110, 120, 130, and 140 may not receive the braking signal of the second processor 152, or the brake modules 110, 120, 130, and 140 may ignore the braking signal of the second processor 152.

The second processor 152 may output the electrical signals corresponding to the service brake, EBD, ABS, TSC, ESC, EPB, and the like to the brake modules 110, 120, 130, and 140 based on the identification of the abnormal operating state (e.g., damage, error, reset, or power cut off, etc.) of the first processor 151.

As such, because the controller 150 includes the first processor 151 and the preliminary second processor 152, the second processor 152 may control the brake modules 110, 120, 130, and 140 even if the first processor 151 is damaged or the first processor 151 is reset or the power supply of the processor 151 is cut off.

The second processor 152 may be implemented with semiconductor devices provided separately from the first processor 151. Alternatively, the second processor 152 may be implemented with processing cores provided in a region separated from the first processor 151 in one semiconductor device.

The second processor 152 may have the same or smaller computational power than the first processor 151. For example, the number of instructions that the second processor 152 can process per unit time may be the same or smaller than the number of instructions that the first processor 151 can process per unit time.

The first power source 81 may include a power network capable of supplying power to the pedal sensor 30, the wheel speed sensor 40, the motion sensor 50, the steering sensor 70, and the brake device 100.

The second power source 82 may include a power network provided separately from the first power source 81, and supply power to the pedal sensor 30 and the brake device 100, and the like.

For example, the first power source 81 may supply power to the first pedal sensor, the first processor 151, the first brake module 110, and the fourth brake module 140. The second power source 82 may supply power to the second pedal sensor, the second processor 152, the second brake module 120, and the third brake module 130.

The first and second power sources 81 and 82 may include separate power circuits for providing power from different batteries or separate power circuits separated from one battery. For example, the first power source 81 may include a first power circuit providing power from a first battery, and the second power source 82 may include a second power circuit providing power from the second battery. Alternatively, the first and second power sources 81 and 82 may include a first power circuit and a second power circuit providing power from one battery, respectively.

Therefore, even if the first power source 81 is damaged, the second power source 82 may normally supply power, and even if the second power source 82 is damaged, the first power source 81 may normally supply power.

As described above, because the brake device 100 according to an embodiment of the disclosure includes the first processor 151 and the preliminary second processors 152, the vehicle 1 may be braked using the second processor 152 even if the first processor 151 is damaged or the power supply of the first processor 151 is cut off.

Hereinafter, an electrical connection relationship between the first processor 151, the second processor 152, and the brake modules 110, 120, 130 and 140 of the brake device 100 will be described in detail.

FIG. 3 is a view illustrating an example of a connection relationship between components included in a brake device according to an embodiment of the disclosure. FIG. 4 is a view illustrating an example of power supply between components included in a brake device according to an embodiment of the disclosure.

As shown in FIG. 3, the vehicle 1 may include the pedal sensors 31, 32, the wheel speed sensors 41, 42, 43, and 44, and the brake device 100. Furthermore, the brake device 100 may include the first processor 151, the second processor 152, and the brake modules 110, 120, 130, and 140.

The pedal sensors 31 and 32 may include the first pedal sensor 31 and the second pedal sensor 32. The first and second pedal sensors 31 and 32 respectively detect the movement of the brake pedal 20 and transmit output signals PTS1 and PTS2 corresponding to the movement of the brake pedal 20 to the first processor 151 and the second processor 152, respectively. For example, the first pedal sensor 31 may be electrically connected to the first processor 151 and provide the first pedal signal PTS1 to the first processor 151. The second pedal sensor 32 is electrically connected to the second processor 152 and provide the second pedal signal PTS2 to the second processor 152.

The wheel speed sensors 41, 42, 43, and 44 may include the first wheel speed sensor 41, the second wheel speed sensor 42, the third wheel speed sensor 43, and the fourth wheel speed sensor 44. The first wheel speed sensor 41 may output a first wheel speed signal WSS1 corresponding to the rotational speed of the first wheel 11, and the second wheel speed sensor 42 may output a second wheel speed signal WSS2 corresponding to the rotational speed of the second wheel 12. The third wheel speed sensor 43 may output a third wheel speed signal WSS3 corresponding to the rotational speed of the third wheel 13, and the fourth wheel speed sensor 44 may output a fourth wheel speed signal WSS4 corresponding to the rotational speed the fourth wheel 14.

The wheel speed sensors 41, 42, 43, and 44 may be electrically connected to both the first and second processors 151 and 152, and output the wheel speed signals WSS1, WSS2, WSS3, and WSS4 (WSS*4) corresponding to the rotational speed of the wheels 11, 12, 13 and 14 to both the first processor 151 and the second processor 152.

The brake modules 110, 120, 130, and 140 may include the first brake module 110 for braking the first wheel 11, the second brake module 120 for braking the second wheel 12, the third brake module 130 for braking the third wheel 13, and the fourth brake module 140 for braking the fourth wheel 14.

Each of brake modules 110, 120, 130, and 140 may include brakes 113, 123, 133, and 143, brake motors 112, 122, 132, and 142, and motor drives 111, 121, 131, and 141. The first brake module 110 includes the first brake 111, the first brake motor 112, and the first motor drive 113, and the first brake 111, the first brake motor 112, and the first motor drive 113 may be provided integrally. The second brake module 120 includes a second brake 121, a second brake motor 122, and a second motor drive 123, and the second brake 121, the second brake motor 122 and the second motor drive 123 may be provided integrally. The third brake module 130 includes the third brake 131, the third brake motor 132, and the third motor drive 133, and the third brake 131, the third brake motor 132, and the third brake motor drive 133 may be provided integrally. Furthermore, the fourth brake module 140 includes the fourth brake 141, the fourth brake motor 142, and the fourth motor drive 143, and the fourth brake 141, the fourth brake motor 142, and the fourth motor drive 143 may be provided integrally.

The brakes 113, 123, 133, and 143 come into contact with brake discs 11a, 12a, 13a, and 14a which rotate together with the wheels 11, 12, 13, and 14, so that the wheels 11, 12, 13, and 14 may be braked. The brakes 113, 123, 133, and 143 may include the first brake 113 associated with the first wheel 11, the second brake 123 associated with the second wheel 12, the third brake 133 associated with the third brake wheel 13, and the fourth brake 143 associated with the fourth wheel 14.

The brake motors 112, 122, 132, and 142 may provide a torque for moving paddle plates so that the paddle plates come into contact with the brake discs 11a, 12a, 13a, and 14a. The rotation of each of the brake motors 112, 122, 132, and 142 is converted into linear movement using the spindle, and the paddle plates may be in contact with the brake disks 11a, 12a, 13a, and 14a by the linear movement of the piston. The brake motors 112, 122, 132, and 142 may include the first brake motor 112 associated with the first brake 111, the second brake motor 122 associated with the second brake 121, the third brake motor 132 associated with the third brake 131, and the fourth brake motor 142 associated with the fourth brake 141.

The motor drives 111, 121, 131, and 141 may include the first motor drive 113 associated with the first brake motor 112, the second motor drive 123 associated with the second brake motor 122, the third motor drive 133 associated with the third brake motor 132, and the fourth motor drive 143 associated with the fourth brake motor 142.

The motor drives 111, 121, 131, and 141 may control driving current for rotating the brake motors 112, 122, 132, and 142 based on the braking signal of the first processor 151 or the second processor 152. For example, each of the motor drives 111, 121, 131, and 141 may include a H-bridge inverter or a three-phase inverter according to the types of the brake motors 112, 122, 132, and 142. Furthermore, each of the motor drives 111, 121, 131, and 141 may include a driving processor for controlling the H-bridge inverter or the three-phase inverter to receive the braking signal from the first processor 151 or the second processor 152, and control the driving current of the brake motors 112, 122, 132, and 142 based on the braking signal.

As such, the motor drives 111, 121, 131, and 141 may process the braking signal received from the first processor 151 or the second processor 152, and control the driving current of the brake motors 112, 122, 132, and 142 based on the processing of the braking signal.

The first and second processors 151 and 152 may be provided integrally. For example, the first and second processors 151 and 152 may be provided on a single substrate or in a single semiconductor device.

The first processor 151 may receive the first pedal signal PTS1 from the first pedal sensor 31, and receive the wheel speed signals WSS*4 from the wheel speed sensors 41, 42, 43, and 44. Also, the first processor 151 may be connected to a communication network for a vehicle CAN0. For example, the first processor 151 may receive a yaw rate signal indicating the yaw rate of the vehicle 1 from the motion sensor 50 and a steering angle signal indicating a steering angle of the vehicle 1 from the steering sensor 70, through the CAN0.

The first processor 151 may be connected to the motor drives 111, 121, 131 and 141 through a first communication network CAN1, and communicate with the motor drives 111, 121, 131, and 141 through the CAN1. The CAN1 may be, for example, a dedicated communication network separate from the CAN0. Because the CAN1 is separated and independent from the CAN0, the braking signal by the first processor 151 may be transmitted to the motor drives 111, 121, 131, and 141 more quickly, thereby the brake modules 110, 120, 130, and 140 allow wheels 11, 12, 13, and 14 to be braked faster. The CAN1 may implement as various communication methods, such as Ethernet, Media Oriented Systems Transport (MOST), Flexray, Controller Area Network (CAN), and Local Interconnect Network (LIN).

The first processor 151 may provide the braking signal indicating a braking force (or a braking acceleration or fastening force) to each of the motor drives 111, 121, 131, and 141. The same braking force may be required for all of the brake modules 110, 120, 130, and 140, or different braking force may be required for different brake modules 110, 120, 130, and 140. For example, the first processor 151 may identify a braking force required by a driver based on the first pedal signal PTS1 and distribute the braking force required by the driver to the front brake modules 110 and 120 and the rear brake modules 130 and 140. Furthermore, the first processor 151, based on the yaw rate signal of the motion sensor 50 and the steering angle signal of the steering sensor 70, may identify the braking force required for any one of the brake modules 110, 120, 130, and 140 and provide the braking signal indicating the braking force to the corresponding brake.

The first processor 151 may transmit the parking signal for parking to each of the motor drives 111, 121, 131, and 141 through the CAN1 based on the driver's required braking force.

The first processor 151 transmits the periodic state signal for indicating the operating state (e.g., a normal operating state or an abnormal operating state) of the first processor 151 to the second processor 152 and the motor drives 111, 121, 131, and 141.

Each of the motor drives 111, 121, 131, and 141 may drive the brake motors 112, 122, 132, and 142 in response to the braking signal of the first processor 151, and transmit a braking state signal indicating the braking force (or braking acceleration or fastening force) by the brake motors 112, 122, 132, and 142 to the first processor 151 through the CAN1.

Each of the motor drives 111, 121, 131, and 141 may drive the brake motors 112, 122, 132, and 142 in response to the parking signal of the first processor 151, and transmit a parking state signal by the motors 112, 122, 132, and 142 to the first processor 151 through the CAN1.

Each of the motor drives 111, 121, 131, and 141 may transmit the periodic state signal indicating the operating state (e.g., normal operating state or abnormal operating state) of each of the motor drives 111, 121, 131, and 141 to the first processor 151 through the CAN1.

The second processor 152 may receive the second pedal signal PTS2 from the second pedal sensor 32, and receive the wheel speed signals WSS*4 from the wheel speed sensors 41, 42, 43, and 44. Furthermore, the second processor 152 may be connected to the CAN0 independently of the first processor 151. For example, the second processor 152 may receive the yaw rate signal representing the yaw rate of the vehicle 1 from the motion sensor 50 and the steering angle signal representing the steering angle of the vehicle 1 from the steering sensor 70*m* through the CAN0.

The second processor 152 may be connected to the motor drives 111, 121, 131 and 141 through a second communication network CAN2, and communicate with the motor drives 111, 121, 131, and 141 through the CAN2. The CAN2 may be, for example, a dedicated communication network separate from the CAN0 and the CAN1. The CAN2 may implement as various communication methods, such as Ethernet, MOS, FlexRay, CAN, and LIN, and the like.

The second processor 152 may identify the operating state (e.g., normal operating state or abnormal operating state) of the first processor 151 based on the periodic state signal of the first processor 151. The second processor 152 may provide the braking signal representing the braking force (or braking acceleration or fastening force) to each of the motor drives 111, 121, 131, and 141 depending on the operating state of the first processor 151.

For example, the second processor 152 may identify the braking force (or braking acceleration or fastening force) of each of the motor drives 111, 121, 131, and 141 based on the normal state of the first processor 151. During normal operation of the first processor 151, the second processor 152 may not output the braking signal to the motor drives 111, 121, 131, and 141, or the motor drives 111, 121, 131 and 141 may not receive the braking signal of the second processor 152, or the motor drives 111, 121, 131, and 141 may ignore the braking signal of the second processor 152.

As another example, the second processor 152 may output the electrical signal corresponding to the service brake, EBD, ABS, TSC, ESC, EPB, and the like to the motor drives 111, 121, 131, and 141, based on the identification of the abnormal operating state (e.g., damage, error, reset, or power cut off, etc.) of the first processor 151.

As shown in FIG. 4, the first power source 81 may supply power to the first pedal sensor 31, the first processor 151, the first motor drive 111, and the fourth motor 141 through a first power network PWR1. As such, the first processor 151 receiving power from the first power source 81 may receive the first pedal signal PTS1 of the first pedal sensor 31 receiving power from the first power source 81. Furthermore, the first and fourth motor drives 111 and 141 convert the power received from the first power source 81 to provide the first and fourth brake motors 112 and 142, respectively.

The second power source 82 may supply power to the second pedal sensor 32, the second processor 152, the second motor drive 121, and the third motor drive 131 through a second power network PWR2. As such, the second processor 152 receiving power from the second power source 82 may receive the second pedal signal PTS1 of the second pedal sensor 32 receiving power from the second power source 82. Furthermore, the second and third motor drives 121 and 131 convert the power received from the second power source 82 to provide the second and third brake motors 122 and, respectively.

The first and second power sources 81 and 82 may include separate power circuits for providing power from different batteries or separate power circuits separated from one battery. Furthermore, the PWR2 may be an independent power network separate from the PWR1.

Therefore, even if the first power source 81 or the PWR1 is damaged, the second power source 82 and the PWR2 may supply power normally, and even if the second power source 82 or the PWR2 is damaged, the first power source 81 and the PWR1 may supply power normally.

As described above, in the brake device 100 according to an exemplary embodiment of the disclosure, even if the first processor 151 is damaged, malfunctioned, reset, or power is cut off, the second processor 152 may control the brake modules 110, 120, 130, and 140 in response to the braking force required by the driver.

For example, in response to the braking force required by the driver through the brake pedal 20 even if the CAN0 is damaged, the brake device 100 may brake the vehicle 1. Furthermore, the brake device 100 may provide additional functions of EBD, ABS, TSC, and EPB.

The brake device 100 may brake the vehicle 1 using a normal communication network even if any one of the CAN1 and CAN2 is damaged. Furthermore, the brake device 100 may provide all additional functions such as EBD, ABS, TSC, ESC, and EPB, and the like.

The brake device 100 may obtain power from a normal power source and brake the vehicle 1 even if any one of the first and second power sources 81 and 82 is damaged. Furthermore, the brake device 100 may provide additional functions of EBD, ABS, TSC, and EPB.

The brake device 100 may brake the vehicle 1 by a normal processor even if any one of the first and second processors 151 and 152 is damaged. Furthermore, the brake device 100 may provide all additional functions such as EBD, ABS, TSC, ESC, and EPB, and the like.

The brake device 100 may brake the vehicle 1 using a normal brake even if any one of the first, second, third, and fourth brake modules 110, 120, 130, and 140 is damaged. Furthermore, the brake device 100 may provide all additional functions such as EBD, ABS, TSC, ESC, and EPB, and the like.

FIG. 5 is a view illustrating an example of a connection relationship between components included in a brake device according to an embodiment of the disclosure.

As shown in FIG. 5, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and motor drives 111, 121, 131 and 141. The first pedal sensor 31, the first processor 151, the first motor drive 113, and the fourth motor drive 143 may receive power from the first power source, and the second pedal sensor 32, the second processor 152, the second motor drive 123, and the third motor drive 133 may receive power from the second power source.

The pedal sensors 31 and 32, the wheel speed sensors 41, 42, 43, and 44, the brakes 113, 123, 133, and 143, the brake motors 112, 122, 132, and 142 may be the same as the pedal sensors, the wheel speed sensors, the brake calipers, and brake motors shown in FIG. 3. Furthermore, the first and second processors 151 and 152 may be the same as the first and second processors shown in FIG. 3.

The motor drives 111, 121, 131, and 141 may control the driving current for rotating the brake motors 112, 122, 132, and 142 based on the braking signal of the first processor 151 or the second processor 152. Each of the motor drives 111, 121, 131 and 141 may include an inverter circuit and a driving processor.

Each of the motor drives 111, 121, 131, and 141 may periodically receive the status signals from the first processor 151 and the second processor 152, and identify the abnormal operating state of the first processor 151 and/or the second processor 152 based on the periodic state signal. Each of the motor drives 111, 121, 131, and 141, based on the identification of the abnormal operating state of the first and second processors 151 and 152, may control each of the brake modules 110, 120, 130, and 140 independently.

Each of the motor drives 111, 121, 131, and 141 may receive the pedal signal PTS1 or PTS2 from the first pedal sensor 31 or the second pedal sensor 32. The first motor drive 111 may receive the first pedal signal PTS1 from the first pedal sensor 31, and the second motor drive 121 may receive the second pedal signal PTS2 from the second pedal sensor 32. The third motor drive 131 may receive the second pedal signal PTS2 from the second pedal sensor 32, and the fourth motor drive 141 may receive the first pedal signal PTS1 from the first pedal sensor 31.

As such, the first and fourth motor drives 111 and 141 receiving power from the first power source 81 may receive the pedal signal PTS1 of the first of the first pedal sensor 31 receiving power from the first power source 81. Furthermore, the second and third motor drives 121 and 131 receiving power from the second power source 82 may receive the pedal signal PTS2 of the second pedal sensor 32 receiving power from the second power source 82.

Each of the motor drives 111, 121, 131, and 141 may identify the braking force required by the driver based on the first pedal signal PTS1 or the second pedal signal PTS2, and drive each of the brake motors 112, 122, 132, and 142 based on the identified braking force required. For example, the first motor drive 111 may control the first brake motor 112 based on the first pedal signal PTS1. The second motor drive 121 may control the second brake motor 122 based on the second pedal signal PTS2. The third motor drive 131 may control the third brake motor 132 based on the second pedal signal PTS2. Furthermore, the fourth motor drive 141 may control the fourth brake motor 142 based on the first pedal signal PTS1.

The motor drives 111, 121, 131, and 141 may receive the wheel speed signal WSS1, WSS2, WSS3 or WSS4 from the wheel speed sensors 41, 42, 43, and 44, respectively. The first motor drive 111 may receive the first wheel speed signal WSS1 from the first wheel speed sensor 41, and the second motor drive 121 may receive the second wheel speed signal WSS2 from the second wheel speed sensor 42. The third motor drive 131 may receive the third wheel speed signal WSS3 from the third wheel speed sensor 43, and the fourth motor drive 141 may receive the fourth wheel speed signal WSS4 from the fourth wheel speed sensor 44.

Furthermore, the motor drives 111, 121, 131, and 141 may transmit the wheel speed signal WSS1, WSS2, WSS3 or WSS4 to the first processor 151 through the CAN1, and transmit the speed signal WSS1, WSS2, WSS3 or WSS4 to the second processor 152 through the CAN2.

As such, each of the motor drives 111, 121, 131, and 141 may receive the wheel speed signal from the wheel speed sensor that measures the rotational speed of a wheel associated with each of the motor drives 111, 121, 131, and 141.

Each of the motor drives 111, 121, 131, and 141 may identify the slip of the wheel based on the wheel speed signals WSS1, WSS2, WSS3, and WSS4 while braking the wheel. Each of the motor drives 111, 121, 131, and 141 may control each of the brake motors 112, 122, 132, and 142 to allow the rotation of the wheels based on the identification of wheel slip. For example, the first motor drive 111 may control the first brake motor 112 to temporarily allow the rotation of the first wheel 11 based on the first wheel speed signal WSS1. The second motor drive 121 may control the second brake motor 122 to temporarily allow the rotation of the second wheel 12 based on the second wheel speed signal WSS2. The third motor drive 131 may control the third brake motor 132 to temporarily allow the rotation of the third wheel 13 based on the third wheel speed signal WSS3. Furthermore, the fourth motor drive 141 may control the fourth brake motor 142 to temporarily allow the rotation of the fourth wheel 14 based on the fourth wheel speed signal WSS4.

As such, the motor drives 111, 121, 131, and 141 may brake the wheels 11, 12, 13, and 14 based on the braking force required by the driver during the abnormal operation of the first and second processors 151 and 152, respectively. Furthermore, the motor drives 111, 121, 131, and 141 may temporarily allow the rotation of the wheels 11, 12, 13, and 14 based on the slip of the wheels 11, 12, 13, and 14. In other words, each of the motor drives 111, 121, 131, and 141 may provide the service brake and ABS.

As described above, in the brake device 100 according to an embodiment of the disclosure, even if the first and second processors 151 and 152 are damaged, malfunctioned, reset, or power is cut off, each of the motor drives 111, 121, 131, and 141 may control the brake modules 110, 120, 130, and 140 in response to the braking force required by the driver. Furthermore, each of the motor drives 111, 121, 131, and 141 may provide an ABS function.

FIG. 6 is a view illustrating an example of a connection relationship between components included in the brake device according to an embodiment of the disclosure.

As shown in FIG. 6, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 121, 131 and 141. The first pedal sensor 31, the first processor 151, the first motor drive 111 and the fourth motor drive 141 may receive power from the first power source, and the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143, and the brake motors 112, 122, 132, and 142 may be the same as the pedal sensors, the wheel speed sensors, the brake calipers, and brake motors shown in FIG. 3. Furthermore, the first and second processors 151 and 152 may be the same as the first and second processors shown in FIG. 3.

The motor drives 111, 121, 131, and 141 may control driving current for rotating the brake motors 112, 122, 132, and 142, respectively. Each of the motor drives 111, 121, 131, and 141 may include an inverter circuit and a driving processor.

Each of the motor drives 111, 121, 131, and 141 may periodically receive the status signals from the first and second processors 151 and 152, and identify the abnormal operating state of the first and second processors 151 and 152 based on the periodic state signal. During the abnormal operating state of the first and second processors 151 and 152, each of the motor drives 111, 121, 131, and 141 may control the brake motors 112, 122, 132, and 142 for braking the vehicle 1 based on the first pedal signal PTS1 or the second pedal signal PTS2. Furthermore, during the abnormal operating state of the first and second processors 151 and 152, each of the motor drives 111, 121, 131, and 141 may control the brake motors 112, 122, 132, and 142 to provide an ABS function based on the wheel speed signals WSS1, WSS2, WSS3, and WSS4.

When the vehicle 1 is driven by the first wheel 11 and the second wheel 12 (e.g., electric current driving), the first motor drive 111 may receive the third wheel speed signal WSS3 from the third wheel speed sensor 43 together with the first wheel speed signal WSS1 from the first wheel speed sensor 41. Furthermore, the second motor drive 121 may receive the fourth wheel speed signal WSS4 from the fourth wheel speed sensor 44 together with the second wheel speed signal WSS2 from the second wheel speed sensor 42. As such, the motor drives 111 and 121 associated with the driving wheels 11 and 12 may receive wheel speed signals from the wheel speed sensors 43 and 44 associated with the driven wheels 13 and 14, respectively.

Each of the first and second motor drives 111 and 121 may identify the spin of the wheel based on the wheel speed signals WSS1, WSS2, WSS3, and WSS4. Each of the first and second motor drives 111 and 121 may control each of the brake motors 112, 122, 132, and 142 to brake the wheels based on the identification of the spin of the wheel. For example, the first motor drive 111 may control the first brake motor 112 in order to brake the first wheel 11 based on the first wheel speed signal WSS1 and the third wheel speed signal WSS3. The second motor drive 121 may control the second brake motor 122 in order to brake the second wheel 12 based on the second wheel speed signal WSS2 and the fourth wheel speed signal WSS4.

As described above, in the brake device 100 according to an embodiment of the disclosure, even if the first and second processors 151 and 152 are damaged, malfunctioned, reset, or power is cut off, each of the motor drives 111, 121, 131, and 141 may provide TSC as well as service brakes and ABS.

FIG. 7 is a view illustrating an example of a connection relationship between components included in the brake device according to an embodiment of the disclosure.

As shown in FIG. 7, the vehicle 1 includes the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 121, 131 and 141. The first pedal sensor 31, the first processor 151, the first motor drive 111, and the fourth motor drive 141 may receive power from the first power source, the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143, and the brake motors 112, 122, 132, and 142 may be the same as the pedal sensors, the wheel speed sensors, the brake calipers, and the brake motors shown in FIG. 3.

The first processor 151 may be provided integrally with the first motor drive 111. For example, the first processor 151 and the first motor drive 111 may be provided on a single substrate or in a single semiconductor device.

The first processor 151 may receive the first pedal signal PTS1 from the first pedal sensor 31, and receive the wheel speed signals WSS1 and WSS*3 from the wheel speed sensors 41, 42, 43, and 44.

The first processor 151 may be directly connected to the first motor drive 111 and may be connected to the second, third, and fourth motor drives 121, 131, and 141 through the CAN1. However, it is not excluded that the first processor 151 is connected to the motor drives 111, 121, 131 and 141 through the CAN1.

The first processor 151 may provide the braking signal indicating the braking force (or braking acceleration or fastening force) to each of the motor drives 111, 121, 131, and 141. Furthermore, the first processor 151 may provide control signals for EBD, ABS, TSC, ESC, and EPB to each of the motor drives 111, 121, 131, and 141.

The second processor 152 may be provided integrally with the second motor drive 121. For example, the second processor 152 and the second motor drive 121 may be provided on a single substrate or in a single semiconductor device.

The second processor 152 may receive the second pedal signal PTS2 from the second pedal sensor 32, and receive the wheel speed signals WSS2 and WSS*3 from the wheel speed sensors 41, 42, 43, and 44.

The second processor 152 may be directly connected to the second motor drive 121, and may be connected to the first, third, and fourth motor drives 111, 131, and 141 through the CAN2. However, it is not excluded that the second processor 152 is connected to the motor drives 111, 121, 131 and 141 through the CAN2.

The second processor 152 may be connected to the first processor 151 through the hard wires, and may periodically receive the status signal from the first processor 151. The second processor 152 may identify the operation state (e.g., the normal operating state or abnormal operating state) of the first processor 151 based on the periodic state signal. The second processor 152 may control the brake modules 110, 120, 130, and 140 based on the identification of the abnormal operating state of the first processor 151.

The second processor 152 may provide the braking signal indicating the braking force (or the braking acceleration or fastening force) to each of the motor drives 111, 121, 131, and 141 based on the identification of the abnormal operating state of the first processor 151. Furthermore, the second processor 152 may provide the control signals for EBD, ABS, TSC, ESC, and EPB to each of the motor drives 111, 121, 131 and 141.

The motor drives 111, 121, 131, and 141 may control the driving current for rotating the brake motors 112, 122, 132, and 142 based on the braking signal of the first processor 151 or the second processor 152.

The motor drives 111, 121, 131, and 141 may include the first motor drive 111 associated with the first brake motor 112, the second motor drive 121 associated with the second brake motor 122, the third motor drive 131 associated with the third brake motor 132, and the fourth motor drive 141 associated with the fourth brake motor 142.

Each of the first and second motor drives 111 and 121 may periodically receive the status signals from each of the first processor 151 and the second processor 152, and identify the abnormal operating state of the first processor 151 and/or the second processor 152 based on the periodic state signal.

Each of the first and second motor drives 111 and 121 may control each of the first and second brake modules 110 and 120 independently based on the identification of the abnormal operating state of each of the first processor 151 and the second processor 152.

The first motor drive 111 integrated with the first processor 151 may receive the first pedal signal PTS1 from the first pedal sensor 31, and receive the wheel speed signals WSS1 and WSS*3 from the wheel speed sensors 41, 42, 43, and 44. Furthermore, the second motor drive 121 integrated with the second processor 152 may receive the second pedal signal PTS2 from the second pedal sensor 32, and receive the wheel speed signals WSS2 and WSS*3 from the wheel speed sensors 41, 42, 43, and 44.

The first motor drive 111 may control the first brake motor 112 based on the first pedal signal PTS1. Furthermore, the second motor drive 121 may control the second brake motor 122 based on the second pedal signal PTS2.

The first motor drive 111 may control the first brake motor 112 in order to temporarily allow the rotation of the first wheel 11 based on the first wheel speed signal WSS1. The second motor drive 121 may control the second brake motor 122 in order to temporarily allow the rotation of the second wheel 12 based on the second wheel speed signal WSS2.

The first motor drive 111 may transmit the first pedal signal PTS1 to the second, third, and fourth motor drives 121, 131, and 141 through the CAN1. Furthermore, the second motor drive 121 may transmit the second pedal signal PTS2 to the first, third, and fourth motor drives 111, 131, and 141 through the CAN2. The third motor drive 131 may control the third brake motor 132 based on the first pedal signal PTS1 or the second pedal signal PTS2. Furthermore, the fourth motor drive 141 may control the fourth brake motor 142 based on the first pedal signal PTS1 or the second pedal signal PTS2.

As such, the first and second motor drives 111 and 121 may share the received signals with the first and second processors 151 and 152, respectively, and provide the service brake and the ABS function based on the identification of the abnormal operating state. Furthermore, the third and fourth motor drives 131 and 141 may perform the service break during the abnormal operating state of the first and second processors 151 and 152.

Furthermore, because the first processor 151 and the second processor 152 are provided to be spaced apart, at least one of the first and second processors 151 and 152 is not damaged in the event of an external impact of the vehicle 1. Accordingly, in the case of an external impact of the vehicle 1, the brake device 100 may operate in response to the braking force required by the driver.

FIG. 8 is a view illustrating an example of a connection relationship between components included in the brake device according to an embodiment of the disclosure.

As shown in FIG. 8, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 121, 131 and 141. The first pedal sensor 31, the first processor 151, the first motor drive 111, and the fourth motor drive 141 may receive power from the first power source, the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143 and the brake motors 112, 122, 132, and 142 may be the same as the pedal sensors, the wheel speed sensors, the brake calipers, and the brake motors shown in FIG. 3. Furthermore, the first and second processors 151 and 152 may be the same as the first processor and the second processor shown in FIG. 7.

The motor drives 111, 121, 131, and 141 may control the driving current for rotating the brake motors 112, 122, 132, and 142 based on the braking signal of the first processor 151 or the second processor 152.

Each of the motor drives 111, 121, 131, and 141 may receive the pedal signal PTS1 or PTS2 from the first pedal sensor 31 or the second pedal sensor 32, identify the driving force required by the driver based on the first pedal signal PTS1 or the second pedal signal PTS2, and drive each of the brake motors 112, 122, 132, and 142 based on the identified required braking force.

The motor drives 111, 121, 131, and 141 may receive the wheel speed signal WSS1, WSS2, WSS3 or WSS4 from the wheel speed sensors 41, 42, 43, and 44, respectively, and identify the slip of the wheel during the braking of the wheel based on the wheel speed signals WSS1, WSS2, WSS3, and WSS4. Each of the motor drives 111, 121, 131, and 141 may controls each of the brake motors 112, 122, 132, and 142 in order to allow the rotation of the wheels based on the identification of the wheel slip.

Optionally, each of the motor drives 111, 121, 131, and 141 may transmit the wheel speed signal WSS1, WSS2, WSS3 or WSS4 to the first processor 151 through the CAN1, and transmit the wheel speed signal WSS1, WSS2, WSS3 or WSS4 to the second processor 152 through the CAN2.

As described above, each of the motor drives 111, 121, 131, and 141 may provide the service brake and ABS during the abnormal operation of the first and second processors 151 and 152. Therefore, Reliability of the brake device 100 may be further improved.

FIG. 9 is a view illustrating an example of a connection relationship between components included in the brake device according to an embodiment of the disclosure.

As shown in FIG. 9, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 121, 131 and 141. The first pedal sensor 31, the first processor 151, the first motor drive 111, and the fourth motor drive 141 may receive power from the first power source, the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143, and the rake motors 112, 122, 132, and 142 may be the same as the pedal sensors, the wheel speed sensors, the brake calipers and brake motors shown in FIG. 3.

The first processor 151 may be provided integrally with the first motor drive 111, and thus may be directly connected to the first motor drive 111. The first processor 151 may be directly connected to the second processor 152 through the hard wires, and may be connected to the second motor drive 121 through the second processor 152. Furthermore, the first processor 151 may be connected to the third and fourth motor drives 131 and 141 through the CAN1.

The second processor 152 may be provided integrally with the second motor drive 121, and thus may be directly connected to the second motor drive 121. The second processor 152 may be directly connected to the first processor 151 through the hard wires, and may be connected to the first motor drive 111 through the first processor 151. Furthermore, the second processor 152 may be connected to the third and fourth motor drives 131 and 141 through the CAN2.

The first processor 151 may transmit the control signals for the service brake, EBD, ABS, TSC, ESC, and EPB to each of the motor drives 111, 121, 131, and 141. The first processor 151 may directly transmit the control signal to the first motor drive 111, and may transmit the control signal to the second motor drive 121 through the second processor 152. Furthermore, the first processor 151 may transmit the control signal to the third and fourth motor drives 131 and 141 through the CAN1.

During the abnormal operation of the first processor 151, the second processor 152 may transmit the control signals for the service brake, EBD, ABS, TSC, ESC, and EPB to each of the motor drives 111, 121, 131, and 141. The second processor 152 may directly transmit the control signal to the second motor drive 121, and may transmit the control signal to the first motor drive 111 through the first processor 151. Furthermore, the second processor 152 may transmit the control signal to the third and fourth motor drives 131 and 141 through the CAN2.

As such, the first and second processors 151 and 152 may be connected to the motor drives 111, 121, 131, and 141 in various ways.

FIG. 10 is a view illustrating an example of a connection relationship between components included in the brake device according to an embodiment of the disclosure.

As shown in FIG. 10, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 121, 131 and 141. The first pedal sensor 31, the first processor 151, the first motor drive 111, and the fourth motor drive 141 may receive power from the first power source, the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143, and the brake motors 112, 122, 132, and 142 may be the same as the pedal sensors, the wheel speed sensors, the brake calipers, and the brake motors shown in FIG. 3.

The first processor 151 may be provided separately from the motor drives 111, 121, 131 and 141, and receive the first pedal signal PTS1 from the first pedal sensor 31, and receive the wheel speed signals WSS*4 from the wheel speed sensors 41, 42, 43, and 44.

The first processor 151 may be connected to the motor drives 111, 121, 131, and 141 through the CAN1. The first processor 151 may provide the braking signal indicating the braking force (or braking acceleration or fastening force) to each of the motor drives 111, 121, 131, and 141.

The second processor 152 may be provided integrally with the second motor drive 121. For example, the second processor 152 and the second motor drive 121 may be provided on a single substrate or in a single semiconductor device.

The second processor 152 may be directly connected to the second motor drive 121, and may be connected to the first, third, and fourth motor drives 111, 131, and 141 through the CAN2. However, it is not excluded that the second processor 152 is connected to the motor drives 111, 121, 131 and 141 through the CAN2. The second processor 152 may provide the braking signal indicating the braking force (or braking acceleration or fastening force) to each of the motor drives 111, 121, 131, and 141 based on the identification of the abnormal operating state of the first processor 151.

The motor drives 111, 121, 131, and 141 may control the driving current for rotating the brake motors 112, 122, 132, and 142 based on the braking signal of the first processor 151 or the second processor 152.

As such, because the first processor 151 and the second processor 152 are provided to be spaced apart, at least one of the first and second processors 151 and 152 is not damaged in the event of an external impact of the vehicle 1. Accordingly, even in the case of an external impact of the vehicle 1, the brake device 100 may operate in response to the driver's required braking force.

FIG. 11 is a view illustrating an example of a connection relationship between components included in a brake device according to an embodiment of the disclosure.

As shown in FIG. 11, the vehicle 1 may include the pedal sensors 31 and 32, the wheel speed sensors 41, 42, 43, and 44, the first processor 151, the second processor 152, the brakes 113, 123, 133, and 143, the brake motors 112, 122, 132, and 142, and the motor drives 111, 112, 113, 114. The first pedal sensor 31, the first processor 151, the first motor drive 111, and the fourth motor drive 141 may receive power from the first power source, the second pedal sensor 32, the second processor 152, the second motor drive 121, and the third motor drive 131 may receive power from the second power source.

The pedal sensors 31 and 32, the wheel speed sensors 41, 42, 43, and 44, the brakes 113, 123, 133, and 143, and the brake motors 112, 122, 132, and 142 may be the same as the pedal sensors, the wheel speed sensors, the brake calipers, and the brake motors shown in FIG. 3. Furthermore, the first and second processors 151 and 152 may be the same as the first processor and the second processor shown in FIG. 10.

The motor drives 111, 121, 131, and 141 may control the driving current for rotating the brake motors 112, 122, 132, and 142 based on the braking signal of the first processor 151 or the second processor 152.

Each of the motor drives 111, 121, 131, and 141 may receive the pedal signal PTS1 or PTS2 from the first pedal sensor 31 or the second pedal sensor 32, identify the driver's required braking force based on the first pedal signal PTS1 or the second pedal signal PTS2, and drive each of the brake motors 112, 122, 132, and 142 based on the identified required braking force.

Each of the motor drives 111, 121, 131, and 141 may receive the wheel speed signal WSS1, WSS2, WSS3 or WSS4 from the wheel speed sensors 41, 42, 43, and 44, respectively, and during the braking of the wheel identify the slip of the wheels based on the wheel speed signals WSS1, WSS2, WSS3, and WSS4. Each of the motor drives 111, 121, 131, and 141 may controls each of the brake motors 112, 122, 132, and 142 in order to allow the rotation of the wheels based on the identification of wheel slip.

As such, each of the motor drives 111, 121, 131, and 141 may provide the service brake and ABS during the abnormal operation of the first and second processors 151 and 152. Therefore, the reliability of the brake device 100 may be further improved.

As is apparent from the above, embodiments of the disclosure may provide an electromechanical brake apparatus that is robust against damage or errors in the electrical system of the vehicle.

Further, the embodiments of the disclosure may provide an electromechanical brake apparatus that provides redundancy to electrical devices such as a power supply circuit, a sensor, and a processor.

Further, the embodiments of the disclosure may provide an electromechanical brake apparatus in which auxiliary processors provided in each wheel independently control a motor provided in each wheel in preparation for damage or errors of the main processor.

On the other hand, embodiments of the disclosure may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes all kinds of recording media in which instructions which can be decoded by a computer are stored, for example, a read only memory (ROM), a random access memory (RAM), a magnetic tape, a magnetic disk, a flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A brake apparatus, comprising:
a first motor configured to provide a rotational force to a first brake to brake a first wheel of a vehicle;
a first drive configured to control a driving current of the first motor;
a second motor configured to provide a rotational force to a second brake to brake a second wheel of the vehicle;
a second drive configured to control a driving current of the second motor;
a first processor connected to the first and second drives through a first network; and
a second processor connected to the first and second drives through a second network separated from the first network;
wherein the first processor is configured to transmit a braking signal to the first and second drives through the first network based on an output of a first pedal sensor, and
the second processor is configured to transmit a braking signal to the first and second drives through the second network based on an output of a second pedal sensor during an abnormal state of the first processor,
the first drive is configured to control the driving current of the first motor to brake the first wheel based on the output of the first pedal sensor during the abnormal state of the first and second processors,
the second drive is configured to control the driving current of the second motor to brake the second wheel based on the output of the second pedal sensor during the abnormal state of the first and second processors,
the first processor is configured to integrate with the first drive, and
the second processor is configured to integrate with the second drive.

2. The brake apparatus of claim 1, wherein
the first processor and the first drive are configured to obtain power from a first power source of the vehicle; and
the second processor and the second drive are configured to obtain power from a second power source of the vehicle.

3. The brake apparatus of claim 1, wherein
each of the first and second processors is configured to receive an output of a first wheel speed sensor for measuring rotational speed of the first wheel and an output of a second wheel speed sensor for measuring rotational speed of the second wheel, and
the first processor is configured to transmit the braking signals to the first and second drives to intermittently brake the first and second wheels based on the outputs of the first and second wheel speed sensors.

4. The brake apparatus of claim 1, wherein
the first drive is configured to receive an output of a first wheel speed sensor for measuring rotational speed of the first wheel,
the second drive is configured to receive an output of a second wheel speed sensor for measuring rotational speed of the second wheel,
the first drive is configured to brake intermittently the first wheel based on the output of the first wheel speed sensor, and the second drive is configured to brake intermittently the second wheel based on the output of the second wheel speed sensor.

5. The brake apparatus of claim 1, wherein the first processor is configured to integrate with the second processor and to separate from the first drive and the second drive.

6. The brake apparatus of claim 1, wherein the first processor is configured to separate from the first drive and the second drive, and the second processor is configured to integrate with the second drive.

7. A brake apparatus, comprising:
a first motor configured to provide a rotational force to a first brake to brake a first wheel of a vehicle;
a first drive configured to control a driving current of the first motor;
a second motor configured to provide a rotational force to a second brake to brake a second wheel of the vehicle;
a second drive configured to control a driving current of the second motor;
a first processor connected to the first and second drives through a first network; and
a second processor connected to the first and second drives through a second network separated from the first network;
wherein the first and second drives are configured to receive a braking signal from at least one of the first and second processors,
the first drive is configured to control the driving current of the first motor to brake the first wheel based on an output of a first pedal sensor during an abnormal state of the first and second processors,
the second drive is configured to control the driving current of the second motor to brake the second wheel based on an output of a second pedal sensor during the abnormal state of the first and second processors,
the first processor is configured to integrate with the first drive, and
the second processor is configured to integrate with the second drive.

8. The brake apparatus of claim 7, wherein
the first processor is configured to transmit the braking signal to the first and second drives through the first network based on the output of the first pedal sensor, and
the second processor is configured to transmit the braking signal to the first and second drives through the second network based on the output of the second pedal sensor during the abnormal state of the first processor.

9. The brake apparatus of claim 7, wherein
the first processor and the first drive are configured to obtain power from a first power source of the vehicle, and
the second processor and the second drive are configured to obtain power from a second power source of the vehicle.

10. The brake apparatus of claim 7, wherein
each of the first and second processors is configured to receive an output of a first wheel speed sensor for measuring rotational speed of the first wheel and an output of a second wheel speed sensor for measuring rotational speed of the second wheel, and
the first processor is configured to transmit the braking signal to the first and second drives to intermittently brake the first and second wheels based on the outputs of the first and second wheel speed sensors.

11. The brake apparatus of claim 7, wherein
the first drive is configured to receive an output of a first wheel speed sensor for measuring rotational speed of the first wheel,
the second drive is configured to receive an output of a second wheel speed sensor for measuring rotational speed of the second wheel,
the first drive is configured to brake intermittently the first wheel based on the output of the first wheel speed sensor, and
the second drive is configured to brake intermittently the second wheel based on the output of the second wheel speed sensor.

12. The brake apparatus of claim 7, wherein the first processor is configured to integrate with the second processor and separate from the first drive and the second drive.

13. The brake apparatus of claim 7, wherein the first processor is configured to separate from the first drive and the second drive, and the second processor is configured to integrate with the second drive.

14. A brake apparatus, comprising:
a first motor configured to provide a rotational force to a first brake to brake a first wheel of a vehicle;
a first drive configured to control a driving current of the first motor;
a second motor configured to provide a rotational force to a second brake to brake a second wheel of the vehicle;
a second drive configured to control a driving current of the second motor;
a first processor connected to the first and second drives through a first network; and
a second processor connected to the first and second drives through a second network separated from the first network;
wherein the first processor is configured to transmit a braking signal to the first and second drives through the first network based on an output of a first pedal sensor,
the first drive is configured to brake intermittently the first wheel based on a output of a first wheel speed sensor that measures rotational speed of the first wheel, and
the second drive is configured to brake intermittently the second wheel based on an output of a second wheel speed sensor that measures rotational speed of the second wheel,
the first drive is configured to control the driving current of the first motor to brake the first wheel based on the output of the first pedal sensor during an abnormal state of the first and second processors,
the second drive is configured to control the driving current of the second motor to brake the second wheel based on an output of a second pedal sensor during the abnormal state of the first and second processors,
the first processor is configured to integrate with the first drive, and
the second processor is configured to integrate with the second drive.

15. The brake apparatus of claim 14, wherein
the first processor and the first drive are configured to obtain power from a first power source of the vehicle, and
the second processor and the second drive are configured to obtain power from a second power source of the vehicle.

16. The brake apparatus of claim 14, wherein
the first processor is configured to transmit the braking signal to the first and second drives to intermittently brake the first and second wheels based on the outputs of the first and second wheel speed sensors.

\* \* \* \* \*